United States Patent [19]

Warp

[11] Patent Number: 5,016,195

[45] Date of Patent: May 14, 1991

[54] HIGH QUALITY PLOTTING TECHNIQUE FOR RASTER PRINTING DEVICES

[75] Inventor: Rick A. Warp, Menlo Park, Calif.

[73] Assignee: Da Vinci Graphics, Inc., Palo Alto, Calif.

[21] Appl. No.: 319,659

[22] Filed: Mar. 3, 1989

[51] Int. Cl.$^5$ .................. G06F 3/12; G06K 15/10
[52] U.S. Cl. ........................... 364/519; 101/93.04; 400/121
[58] Field of Search .................. 364/519, 521, 518; 340/739; 101/93.04, 93.05, 93.15, 93.16; 400/65, 121, 124

[56] References Cited

U.S. PATENT DOCUMENTS

| | | | |
|---|---|---|---|
| 4,205,389 | 5/1980 | Heartz | 364/900 |
| 4,254,467 | 3/1981 | Davis et al. | 364/521 |
| 4,364,024 | 12/1982 | Paetsch | 382/3 |
| 4,458,330 | 7/1984 | Imsand et al. | 364/900 |
| 4,469,460 | 9/1984 | Hughes et al. | 400/322 |
| 4,479,192 | 10/1984 | Yamagami | 364/719 |
| 4,601,002 | 7/1986 | Rosenthal | 364/518 |
| 4,629,342 | 12/1986 | Futaki | 400/121 |
| 4,632,579 | 12/1986 | Takano et al. | 400/121 |
| 4,833,626 | 5/1989 | Malcolm | 364/519 |
| 4,856,920 | 8/1989 | Sanders, Jr. | 400/124 |

Primary Examiner—Gary V. Harkcom
Assistant Examiner—Raymond J. Bayerl
Attorney, Agent, or Firm—Fliesler, Dubb, Meyer & Lovejoy

[57] ABSTRACT

A method and apparatus for preparing and printing pen-stroke image information on a raster-type output device. The image is first vectorized, then given one of a number of slope classifications. For vertical vectors and vectors within a predetermined angle of the vertical, only every n'th dot on the vector is printed. For vectors in the next slope class closer to the horizontal, every $(n/2)$'th dot is printed. For vectors in the next slope class closer to the horizontal, dots $nk$, $nk+m_2$, and $nk+m_1$ are printed, where $k$ is any integer, $m_2$ is $n/4$, and $m_1$ is $n/2$. For dots in the next slope class closer to the horizontal, every $(n/4)$'th dot is printed. A novel vector endpoint modification scheme, novel redundant dot removal schemes, and a novel adaptive print speed control are also disclosed.

50 Claims, 5 Drawing Sheets

HIGH QUALITY PLOTTING TECHNIQUE FOR RASTER PRINTING DEVICES

A portion of the disclosure of this patent document contains material which is subject to copyright protection. The copyright owner has no objection to the facsimile reproduction by any one of the patent document or the patent disclosure as it appears in the Patent & Trademark Office patent file or records, but otherwise reserves all copyright rights whatsoever.

BACKGROUND OF THE INVENTION

1. Field of the Invention

The present invention relates to control systems for graphics output devices, and more particularly, a technique for preparing and printing pen-stroke image information on a raster-type output device.

2. History of the Prior Art

Serial printing mechanisms capable of producing random graphic and character images on a page have existed for some time in the form of dot matrix, ink jet, thermal and other printers. These devices typically operate by scanning a printhead or other print mechanism across a page while printing individual dots on the paper (or other printing medium), advancing the paper, then repeating the process. This process can also be accomplished by different sequences of motions of the printhead and the paper in combinations to produce stripes of image on the medium. The printhead may contain any number of printing elements, allowing multiple rows of dots (print lines), and/or sometimes multiple colors, to be printed in any single pass of the printhead. Some printers make multiple passes of the printhead in a single section of the paper, printing a single color in each pass.

These printing mechanisms are all speed constrained by printheads with limited printing frequency capabilities, typically on the order of 500-10,000 dots per second per printing element. Frequency constraints are the result of mechanical speed limitations or heat buildup (as in thermal and thermal ink jet), drop formation rates (ink jet), or other factors. As a result of these frequency constraints, these printers have typically limited their applications to those requiring only limited dot placement resolution on the printing medium.

Greater resolution using classical technologies would have a significant effect on throughput. To double the resolution would theoretically require twice as many dots to be printed per pass (to double the horizontal resolution) and would also require twice as many passes of the printhead to be made (to double the vertical resolution). The effect then would be to reduce throughput by a factor of four. Any increase in resolution by a factor of X would produce an X-squared reduction in throughput. To achieve truly high quality output using these technologies would have an unacceptable effect on throughput.

Graphics processors and vector-to-raster converters have typically taken the form of graphics information being input to the system and an array of dots being output to replicate the graphics input language as accurately as possible, given the resolution of the device. This is done without regard for the mechanical configuration or limitations of the mechanical device. That is, dots are placed at each point on the raster array which is closest to the desired vectors' positions.

To do this, the graphics processor must typically parse graphics language input (such as HPGL13 Hewlett Packard Graphics Language) into a series of vectors. Complex commands such as characters, circles, etc. may result in multiple vectors being generated. Then, a vector-to-raster converter typically takes a resulting vector with endpoints x1, y1 and x2, y2. It converts this into an equivalent of the following form:
x1, y1
slope
length (in either x or y)
color (if the device produces color output)

Beginning at x1, y1, then, it increments y (or x) by one, adds the slope to x (or y), then finds the point on the output array closest to this result. The converter then repeats this process until it reaches the end of the vector and repeats the entire process for each vector to be printed. Only after converting all vectors for a given section of output can that output begin, since the last vector may begin at the first position to be printed.

Some converters perform this operation on the entire plot file before beginning to print. Others convert on the fly, performing these operations on only a band of output at a time (banded vector to raster converters). These converters sometimes use sorting and sections of vectors to improve their efficiency. None of these techniques, however, is designed to change the eventual placement of dots on the output medium. They are merely different methods of trading memory requirements with processing time.

Printhead control has also been done with little regard to the capabilities of the printhead. Although most printing mechanisms typically skip over large blank areas of output, when they print they virtually always do so at a single, preset speed consistent with the maximum dot placement density achievable for a preselected resolution (e.g. letter quality or draft). Again, they have not looked at how they may take advantage of processing or limit their speed constraints by treating the entire printing process as a system rather than a set of black boxes (vector to raster converter, motor control, print element drivers, printhead and print elements).

SUMMARY OF THE INVENTION

The present invention overcomes many of the problems of current systems by recognizing the limitations and characteristics of the printhead, the critical path to speed, and working to mitigate these limitations and to take advantage of strengths from the moment graphics data is brought into the device.

The novelty of the invention derives in part from a recognition of the relationship between dot size on the writing medium and addressable resolution. In general, the dot diameter most appropriate is larger than the distance between addressable points.

A series of these dots, placed in close proximity to one another can form a line. In fact, these dots do not have to be placed at each addressable point to fully define that line, although they should be placed with full addressable resolution to maintain the image quality expected of that resolution. FIG. 7 shows two dots 300 and 302 near each other in a row of dots. The distance designated A represents the "scalloping" effect on the line created by the distance between dots. (The distance A is sometimes referred to herein as the "scalloping distance." As the dots get closer together, A decreases; as they get farther apart, A increases. Because the human eye has limits in its ability to resolve A, dots can be spread apart until A is just below the level at which the eye can see the scalloping of the line.

As long as no information is lost when dots are spread as described here, the addressable resolution integrity is maintained while limiting the number of dots that must be placed on the printing medium. To determine whether information has been lost in this spreading process, the only difference between a theoretically perfect line of width equal to the dot diameter should be the scalloping. Potential losses of information, if improperly implemented, would most often occur at the ends of vectors. Loss of information could also occur along a vector if the full resolution of the device is sacrificed in the spreading process.

For the purposes of the present invention, the various output dot print lines which the output device will print are considered divided into a number of major print lines interleaved with one or more minor print lines. In the preferred embodiment, there are three evenly spaced minor print lines interleaved between each pair of major print lines. Each major print line and its three subjacent minor print lines therefore make up a group of four print lines. The configuration is chosen such that for a large percentage of vectors, printing only those dots of the vector which occur on a selected one of the print lines in each group will result in a printed vector having no less than a desired level of line quality.

Each vector is then converted to a series of dots chosen to concentrate them as much as possible on the major print lines. However, if the slope that the vector makes with the print line is smaller than a predetermined value, for example 45°, then additional dots are required to achieve the desired level of line definition. For these vectors, extra dots are placed as much as possible on a first one of the minor print lines, the center interleaving print line in the preferred embodiment.

For vectors with slopes smaller than a second angle to the print lines, smaller than the first angle, printing only two dots per group of print lines may still not provide enough line definition. For these vectors a dot is placed on one or more of the remaining print lines in each group, again according to an order of preference. If the system includes additional minor print lines, and additional dots are still needed for the desired level of line definition on a particular vector, dots are placed on these print lines also in an established order of preference.

Accordingly, dots of a vector are designated for print only according to an established order of preference, and only as necessary to achieve the desired level of line definition. If only one dot per group of print lines is required for line definition, it is preferentially placed on a first, predetermined one of the print lines in each group (i.e. the major print line). If a second dot in each group is required for line definition, it is preferentially placed on a second predetermined print line of each group (preferably a print line halfway between each of pair of major print lines). If a third dot in each group of print lines is needed, it is preferentially placed on a third predetermined one of the print lines in each group, and if a fourth dot in each group of print lines is needed, it is preferentially placed on a fourth predetermined print line in each group. This procedure can continue to whatever number of print lines are available in each group.

Once the vectors have been converted in this manner to dot patterns, or, if banded vector-to-raster conversion is being performed, then once all the vectors in a band are converted, the dot patterns may be printed on any of the standard output devices using a novel adaptive speed control technique. In particular, as a dot line is being printed, the print mechanism slows down or speeds up in accordance with the density of dots which must be printed in an upcoming portion of the print line. Thus, since the dot patterns for printing have been concentrated onto the print lines in a preferential order, the print mechanism will typically have its lowest average speed when printing the first print line of a group, a substantially higher average speed when printing the second predetermined print line of each group, a still higher average speed when printing the third predetermined print line of each group, and so on.

Print mechanisms often print on a plurality of print lines on each pass. For example, the FUJITSU DL3400 24-pin printer prints dots on 24 print lines on each pass of the printhead. In this case the distance between major print lines is defined equal to the vertical distance between pins on the printhead. Thus in the preferred embodiment, where each group of print lines consists of four print lines, 24 major print lines are printed on one pass. The paper is then advanced by one print line, and the first one of the minor print lines in each of the 24 groups are printed on the next pass. The paper is then advanced by one more print line and the second of the minor print lines is printed in each of the 24 groups. The paper is then advanced by yet another print line and the third of the minor print lines is also printed for each of the 24 groups. Finally, the paper is advanced by 93 print lines and printing of the next 24 groups of print lines begins.

In this situation the adaptive speed control must take into account the dot density of all 24 of the grid lines which are being printed on any particular pass. Accordingly, the printhead is adaptively sped up or slowed down in accordance with the highest density in the upcoming portion of all the print lines which are being printed on a particular pass, instead of in accordance with the dot density in an upcoming portion of only one of the print lines. Whether the print mechanism prints one print line per pass or more, the inventive technique results in a substantial speed improvement for a given level of image quality.

In another aspect of the invention, the endpoints of many of the input vectors are slightly modified to line them up with major print lines. This process creates an absolute error in position, but it is not perceptible to the eye and does increase speed substantially. However, vectors shorter than a predetermined number of dots may be omitted from the endpoint modification process.

In yet another aspect of the invention, the bit map generated by the vector-to-raster conversion technique described above may be post-processed in order to eliminate redundant dots on the output. Redundant dots are those which may be omitted without violating the desired level of quality. For example, where a string of three dots (either horizontally, vertically or on an angle) are spaced such that the outer two dots are within the maximum permissible spacing for the desired level of quality (see FIG. 7), the center dot then adds no information to the plot. Such redundancies can be created where multiple vectors are spaced closely or cross in close proximity to one another.

Redundancy elimination can be implemented to different degrees, depending on trade-offs between computational speed/power versus print speed. For example, a one-dimensional approach can be taken in which redundancies are detected and eliminated only within each respective dot line; diagonal and vertical redundancies are ignored.

In a two-dimensional approach, as in the vector-to-raster conversion, elimination of redundancies is done in such a way as to minimize the number of dots which must be printed on the interleaving passes of the printhead. This is done by eliminating first all the redundant dots which occur on the least preferred one of the print lines in each group, then eliminating all the redundant dots which occur in the next least preferred one of the print lines in each group, and so on up the order preference until redundant dots are eliminated from the major print lines. This order of elimination serves to concentrate dots in the same print lines as does the vector-to-raster converter.

Though each of the above aspects of the invention are most useful when used in conjunction with the others, it will be appreciated that they can also be used separately. For example, without limitation, adaptive print speed control will likely speed up the printing of any bit mapped image to some degree, whether or not it was created using the vector-to-raster conversion technique described above. As another example, the redundancy elimination technique can also be used on any bit pattern, regardless of whether it was generated using the inventive vector-to-raster conversion technique. However, the greatest advantage is achieved by using all aspects of the invention together.

BRIEF DESCRIPTION OF THE DRAWINGS

The objects and the advantages of the present invention will become more apparent and more readily appreciated from the following detailed description taken in conjunction with the accompanying drawings, of which.

DETAILED DESCRIPTION

Figure 1:
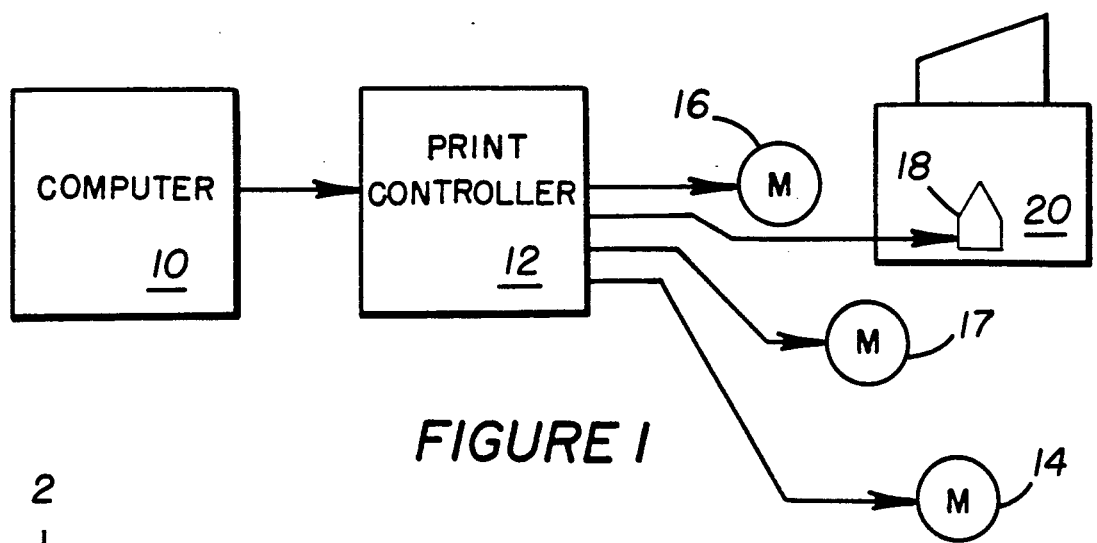
FIG. 1 shows the apparatus in which the invention may be used.

FIG. 1 shows a typical system organization in which the invention may be used. It comprises a computer 10, which provides graphics information to a printer controller 12, which in turn controls the carriage motor 14, the linefeed motor 16, the print elements on printhead 18, and the color motor 17 in a dot matrix printer 20. The computer 10 can be any computer, or any other source of graphics information. In the preferred embodiment the computer provides the graphics information in the form of Hewlett Packard Graphics Language ("HPGL") commands, but it will be understood that graphics information in any form would suffice. The print controller 12 converts the input graphics information into a set of input vectors, if the graphics information is not already in that form. It then converts the vector information to dot raster information in a manner described below, and outputs the resulting bit patterns to the printer 20.

The printer 20 is a standard 24-pin printer which has been specially modified to permit very high resolution dot placement. In particular, the printer 20 may be a FUJITSU DL3400 which has been modified to permit four times the normal dot placement resolution both horizontally and vertically. Since normal dot placement resolution for this printer is 180 dots per inch in each dimension, the modified printer permits an addressable resolution of 720×720 dots per inch. The modification may be accomplished by mechanically gearing down each of the motors 14 and 16, or, preferably, by direct electronic control of the motors 14 and 16. It is well known how to perform either of these modifications. For increased resolution in the horizontal dimension, as described in more detail below, no modification to motor 14 is necessary. Instead, increased resolution can be accomplished by appropriately timing the firing of the print pins as the carriage moves at a known velocity.

Overall System Flow

Figure 2:
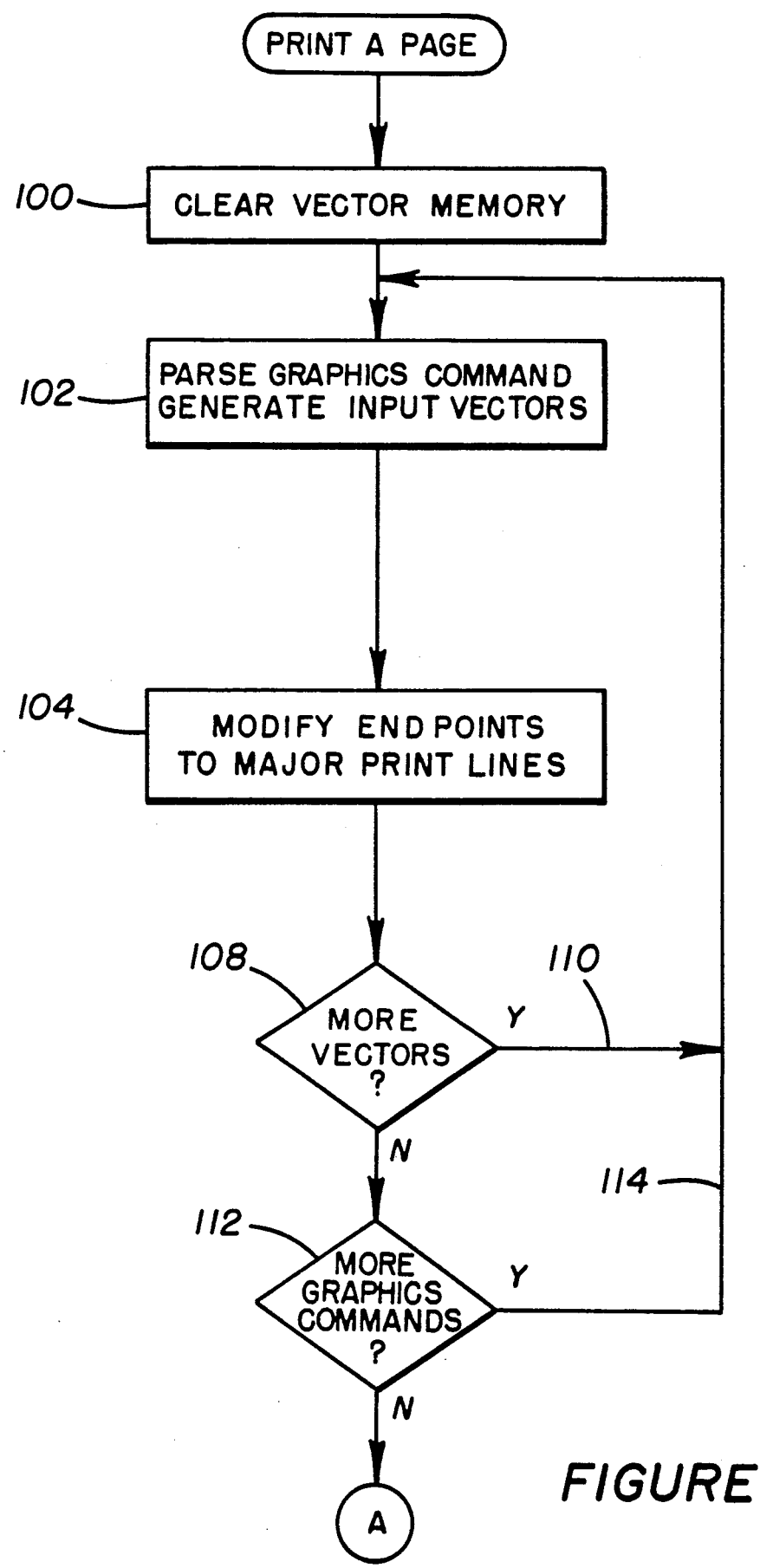
FIGS. 2-3 show a flowchart of a method according to the invention.
Figure 3:
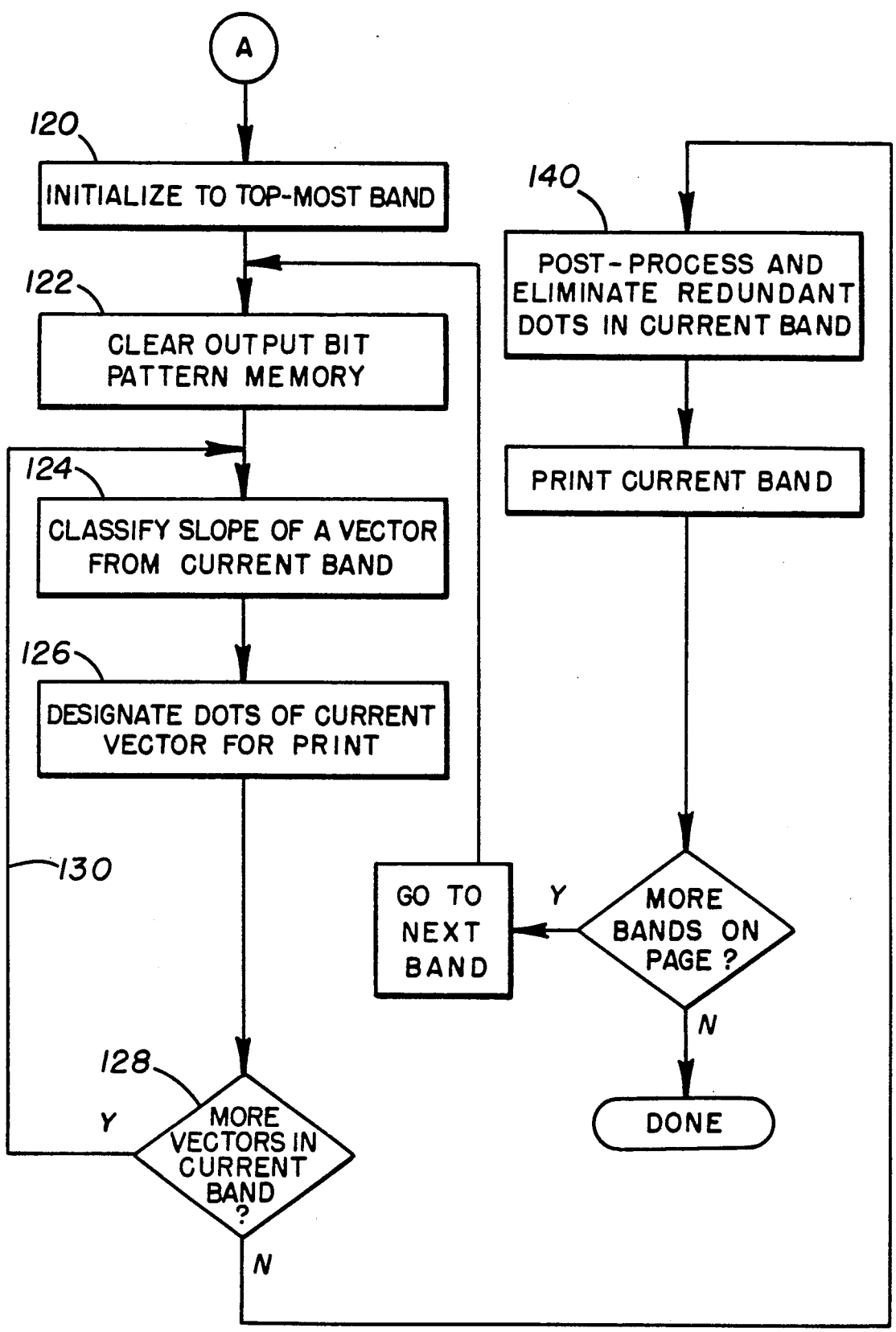

FIGS. 2 and 3 show an overall system flow chart for the preferred embodiment. The system performs banded vector-to-raster conversion, but it will be understood that appropriate modifications of the flow can be made in order to convert an entire page of graphics information to a dot pattern before any of it is printed. Banded vector-to-raster conversion requires far less memory than full page conversion, since memory is needed only for the vector descriptors and for one band worth of dots. However, banded vector-to-raster conversion can accommodate only a fixed, maximum number of vectors before exhausting memory, whereas a full page vector-to-raster converter can accommodate any number of vectors. In the preferred embodiment, however, in which dots are printed with an addressable resolution of 720 dots per inch, about 20 MB of memory would be required to perform full page vector-to-raster conversion for an 8½×11 inch page. It is therefore preferred, for this embodiment, to perform the conversion in a banded manner.

As explained in more detail below, in the preferred embodiment the printhead prints a set of 96 print lines in four passes (one major pass followed by three interleaving passes), before going on to the next set of 96 print lines. Thus, it is advantageous, though not necessary, that the bands be 96 print lines each. At 720 vertical dots per inch, that comes to about 0.13 vertical inches per band.

Referring to FIG. 2, when a page of graphics information is to be printed, the vector memory is first cleared in a step 100. In a step 102, input graphics command created by an external processing device, such as a computer, are parsed to generate the vectors which will be further processed in the inventive apparatus. In the preferred embodiment, the input graphics commands are accepted in HPGL, which is a well defined, often used language for communicating with pen plotter output devices. However, other input graphic forms can be used.

The parsing step 102 converts each HPGL command, or set of commands, into a plurality of "raw" straight line vectors. It is well known how to perform such a conversion. For example, a command to print a circle will result in a large number of straight line vectors at varying angles and with varying slopes. The same is true with a command to print a letter, such as the letter "S".

In the parsing step 102, various line widths are accomplished by combining two or more of the raw vectors internally to generate lines wider than the standard single dot width. These vectors are offset from each other by a fixed predetermined distance normal to the original vector. For example, to create a line that is two dots wide, the parsing step 102 may generate two vectors which are four dot positions apart and centered around and parallel to the nominal vector defined by the HPGL command, and in place of that nominal vector. Each of the two vectors' endpoints, then, will be about two dot positions from the nominal vector in a direction perpendicular to that nominal vector. Similarly, a 3-dot-wide line may be created by generating three vectors, each 4-dot positions apart in distance. One of the three vectors will be the same as the nominal vector defined by the HPGL command, and the other two vectors are each offset by four dot positions from the nominal vector in a direction perpendicular to that nominal vector.

Also, HPGL permits a choice of pens for any given vector. The preferred embodiment considers an HPGL pen number to indicate a print color and line width, and the color is generated using one or more of the four ribbon colors available on the printer. If the HPGL input command calls for a vector having a print color which must be generated using two or more of the ribbon colors, the parsing step 102 generates the appropriate number of vectors having identical position, size and slope, one for each of the ribbon colors which must be printed.

The parsing step 102 represents each raw vector in a format that includes the x and y coordinate positions of the uppermost endpoint of the vector, the length of the vector in the vertical dimension, the slope of the vector (in the form of the number of x coordinate positions which the vector traverses horizontally for a known traverse vertically), and ribbon color.

In an endpoint modification step 104, as each vector is generated, its endpoints are modified to line up both endpoints with major print lines. These print lines are defined as those in the eventual bit map corresponding to the major passes of the printhead (not the interleaving passes). In the preferred embodiment, major print passes occur for every fourth print line. Thus, endpoint modification is accomplished by first rounding the y positions of both endpoints of the vector to the nearest integer multiple of four print lines. If an endpoint of raw vector is exactly centered between two of these integer multiples of four print lines, then it does not matter which direction of modification is used. However, the direction chosen must be chosen consistently in order to make sure that different vectors meet up properly.

The endpoint modification step 104 creates an absolute error in the position of vectors, but this error is not perceptible to the eye and does increase speed substantially. However, for vectors shorter than a predetermined length, for example seven dots, the endpoint modification step is omitted because it would change the slope of the vector perceptibly. The predetermined length appropriate for a given embodiment of the invention may vary dramatically for different dot size and addressable resolution.

The endpoint modification step 104 may be performed either as part of the parsing step 102, in which the endpoints are modified even before the vector is stored, or it may be performed separately on each of the raw vectors after all the raw vectors are generated for a given graphics command or set of commands. The flow chart of FIG. 2 employs the former technique. In either case, the vectors as modified by the endpoint modification step 104 are sometimes referred to herein as "operating vectors". Also, if the endpoint modification step 104 is omitted for an embodiment of the invention, the operating vectors are the input vectors.

As indicated by testing step 108 and looping path 110, the endpoint modification step 104 is repeated for each of the vectors generated by the parsing step 102 in response to a given graphics command or set of graphics commands. Similarly, as indicated by testing step 112 and looping path 114, the entire process is repeated until all of the graphics commands for the page are processed. Because the preferred embodiment performs banded conversion, all the vectors for the page must be generated in this fashion before the conversion to raster begins.

The overall system flow chart beginning with FIG. 2 continues with the point marked "A" in FIG. 3. As mentioned, vectors are converted to dot patterns one band at a time. Accordingly, the system is initialized in a step 120 to convert the topmost band first. The output bit pattern for the band is then cleared in a step 122 in preparation for turning on specific dots to be designated in a vector-to-raster conversion step 126. The apparatus then enters a loop, as indicated by testing step 128 and looping path 130, to convert all the vectors in the band to bit patterns.

The conversion process takes place in two steps: a slope classification step 124, for classifying the vector into a number of slope classes as defined below, followed by a dot designation step 126, for designating the particular dots to be turned on. Preferably these two steps are pipelined, meaning while one vector is in dot designation step 126, the next vector is being classified in slope classification step 124. Also, preferably, the dot designation step 126 is performed by a custom gate array while the slope classification step 124 is performed in software.

Slope Classification

The slope classification assigned to the vector in step 124 will ultimately determine which dots of the vector will be designated for print. As previously explained, Applicant has recognized that not all the dots of a vector need be printed in order to achieve a desired level of quality. This is especially true where, as in the present embodiment, dots can be placed every 1/720 inches apart. In fact, there is a maximum dot placement distance which can be defined either empirically or mathematically, at which dots can be placed without compromising a desired level of image quality. Such maximum dot placement distance depends on factors such as the dot placement resolution available, the desired level of line definition, the dot placement accuracy, the diameter of each dot and the raggedness of its edges, among other things. For the purposes of the present embodiment, using the FUJITSU DL3400 printer Applicant has determined that dots can be placed about 0.008 inches apart without compromising image quality.

Though placing dots of a vector as far apart as possible is desirable, it will not necessarily result in the fastest plot. The printhead on a typical 24-pin printer will print all i'th ones of the print lines in each of the 24 groups corresponding to the elements on the printhead, in a single pass. The paper then advances by one print line, and the dots designated for print on the (i+1)'th print line of each of the 24 groups is printed on the next pass. However, if no dots are designated for print on a particular print line in any of the 24 groups, the printer need not make a pass at all for that print line. Also, even if a pass must be made, the printhead can move much more quickly if the dot density is lower.

Figure 4:
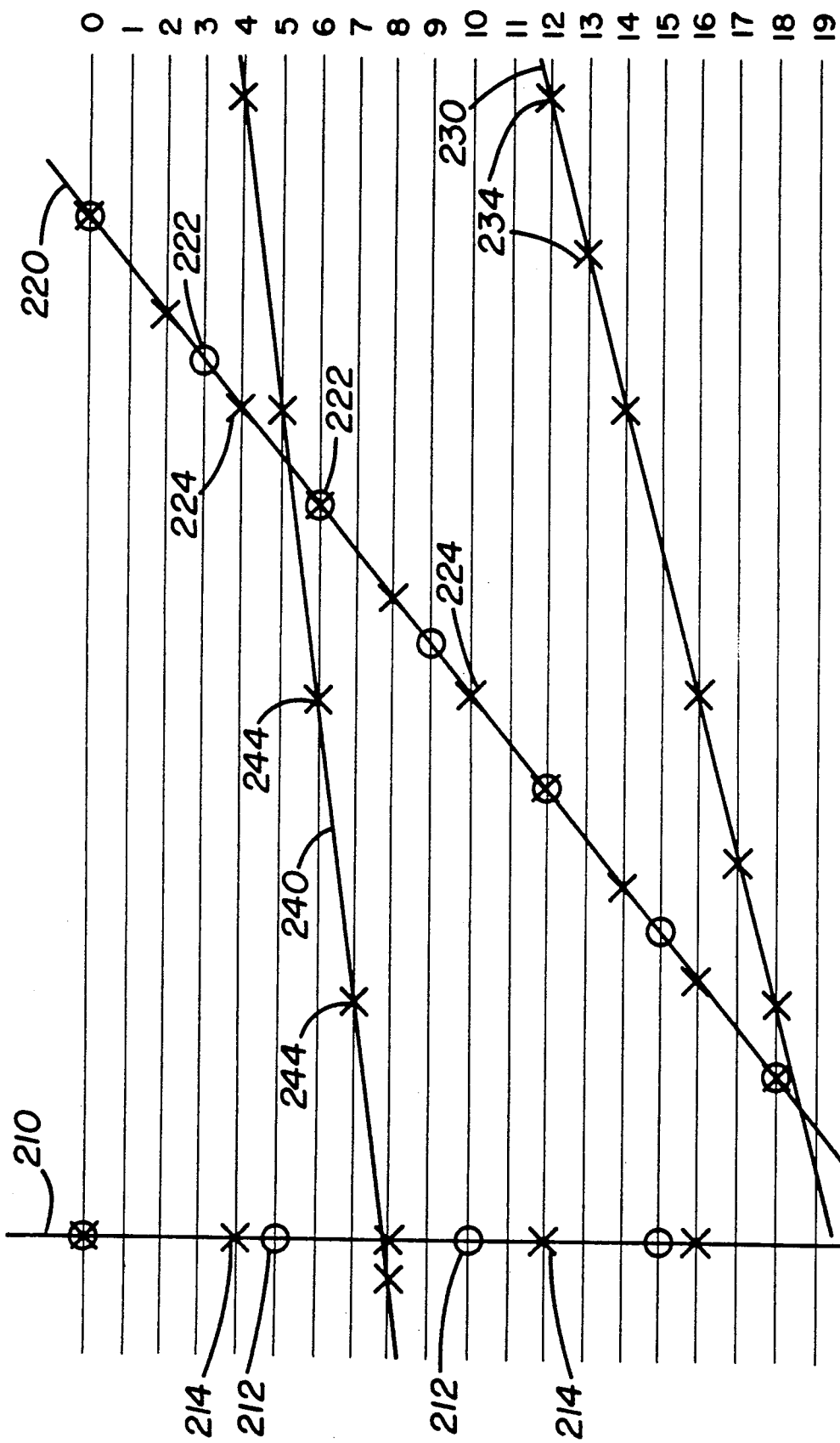
FIG. 4 is a diagram of printer output, useful for explaining the invention.

FIG. 4 shows 20 print lines numbered 0 through 19. These print lines represent five major print lines bearing numbers 4i, i=0,1,2,3 and 4 together with the three minor print lines 4i+1, 4i +2 and 4i +3 subjacent each of the major print lines 4i. Each four print lines comprising a major print line 4i through minor print line 4i +3, represent a group of print lines as would be output by the printer.

Vector 210, shown on FIG. 4, is a straight vertical vector which is to be drawn on the printer output. Since the dots can be placed as much as 8 mils apart, and since the print lines are only approximately 1.4 mils (1/720 inches) apart, this means that dots can be placed as far apart as every fifth print line without compromising image quality. Such dots are shown as circles 212 in FIG. 4.

However, instead of placing dots on every fifth print line for the vector 210, apparatus according to the invention concentrates the dots as much as possible in a preferential order of the print lines in each of the groups. For the vertical line 210, dots are printed on every fourth print line, specifically the major print line in each group of print lines, instead of every fifth print line. These dots are shown as X's 214 in FIG. 4. If vector 210 is the only vector to be printed in the 24 groups, then it can be seen that the entire Vector Will be printed on the first (major) pass of the printhead. None of the interleaving passes will be necessary. If the vector 210 is not the only vector to be printed in the 24 groups of print lines, then at least this choice of dots does not add any dots to be printed on any of the less preferred interleaving print lines. Hence, the vector 210 is printed using more dots (one dot every 4/720 inches instead of one dot every 5/720 inches), at a much higher speed.

Vectors which are close but not exactly vertical can also be printed by placing dots on only major print lines. However, at some angle, dots placed only on the major print lines will be farther apart than the maximum spacing of 8 mils. Vector 220 in FIG. 4, for example, has a slope of about 40° to the print lines. Dots placed only on the major print lines would be spaced an absolute distance of about 8.9 mils from each other, larger than the maximum distance permitted by the desired level of quality. Dots can be placed on every third print line, as shown by circles 222 on vector 220, and this would satisfy the maximum dot placement requirement. However, as with the dots 212 on vector 210, printing every third dot on the vector would require the head to make four print passes to print it. Accordingly, dots are instead printed at every two print lines, as shown by X's 224 on vector 220. A vector with dots chosen in this way can be printed with only two passes of the printhead, and at higher image quality than if dots are placed on every third print line. Moreover, as shown in FIG. 4, the dots 224 which are selected for print are the first and third print line in each of the 24 groups of four print lines each. Thus the third print line in each group, which is also the second minor or interleaving print line, is the print line of the group which is preferred second to the major print line if dots must be placed more closely than one every major print line.

As the slope of a vector becomes smaller than a second angle to the print lines, it will be seen that even two dots per group of print lines will not keep the dots close enough together to satisfy the quality criteria. For vectors having a slope smaller than that second angle, three dots are printed in each group of print lines. These dots are chosen consistently in all groups as print lines 1, 2, and 3. These dots are shown as X's 234 on vector 230 in FIG. 4, which has a slope of about 15° to the print lines.

Similarly, for vectors having a slope smaller than yet a third angle, all four dots will be necessary to maintain print quality. Such dots are shown as X's 244 on vector 240, which has a slope of about 7.5°.

Finally, below yet a fourth slope angle, multiple dots on each of the four print lines are required to achieve the desired level of image quality.

It can be seen that dots of a vector are designated for print only in a particular order of preference of the print lines in each group, and they are designated with consistency for all vectors in all 24 groups. In the present embodiment the order of preference is as follows:

1. The first print line of each group of four print lines (the major print line);
2. The third print line of each group of four print lines (the second minor or interleaving print line);
3. The second print line of each group of four print lines (the first minor or interleaving print line); and
4. The fourth print line of each group of four print lines (the third minor or interleaved print line).

Dots of a vector are designated for print only in the above order of preference, only to the depth necessary to achieve the desired level of print quality. Dots will therefore be placed on the page with a heavy concentration on major print lines, a somewhat lighter concentration on the third print line of each group, a still lighter concentration on the second print line of each group, and the lightest concentration of all on the fourth print line of the group. Such an arrangement maximizes the chances that a particular print line will have no dots at all, and may therefore be skipped in the printing process, or that a particular print line can be traversed rapidly due to minimal dot density. Note that the print lines chosen for the third and fourth order of preference above may be interchanged in a different embodiment if desired. Printing on the first, second and third lines in a group is not different from printing on the first, third and fourth print lines in the group.

As previously set forth, the preferred embodiment implements the vector-to-raster conversion in a two step pipelined process. The first step, step 124 in FIG. 3, classifies the current vector according to its slope. For the purposes of handling vectors as described above, seven slope classes are defined as follows:

Class 1. Horizontal lines.

Class 2. Vertical lines.

Class 3. Lines between vertical and a first angle to the print line, for example 45°. These lines require no interleaving passes of the printhead.

Class 4. Lines having a slope between the first angle to the print line and a second angle to the print line, for example 20°. Lines in class 4 require one interleaving pass of the printhead.

Class 5. Lines between the second angle to the print lines and a third angle to the print lines, for example 10°. Lines in class 5 require two interleaving passes of the printhead.

Class 6. Lines between the third angle to the print lines and a fourth angle to the print lines, for example 5°. These lines will require all three interleaving passes of the printhead.

Class 7. Lines having a slope smaller than the fourth angle to the print line. These lines not only require all three interleaving passes of the printhead, but they also require printing multiple dots on each print line.

Figure 5:
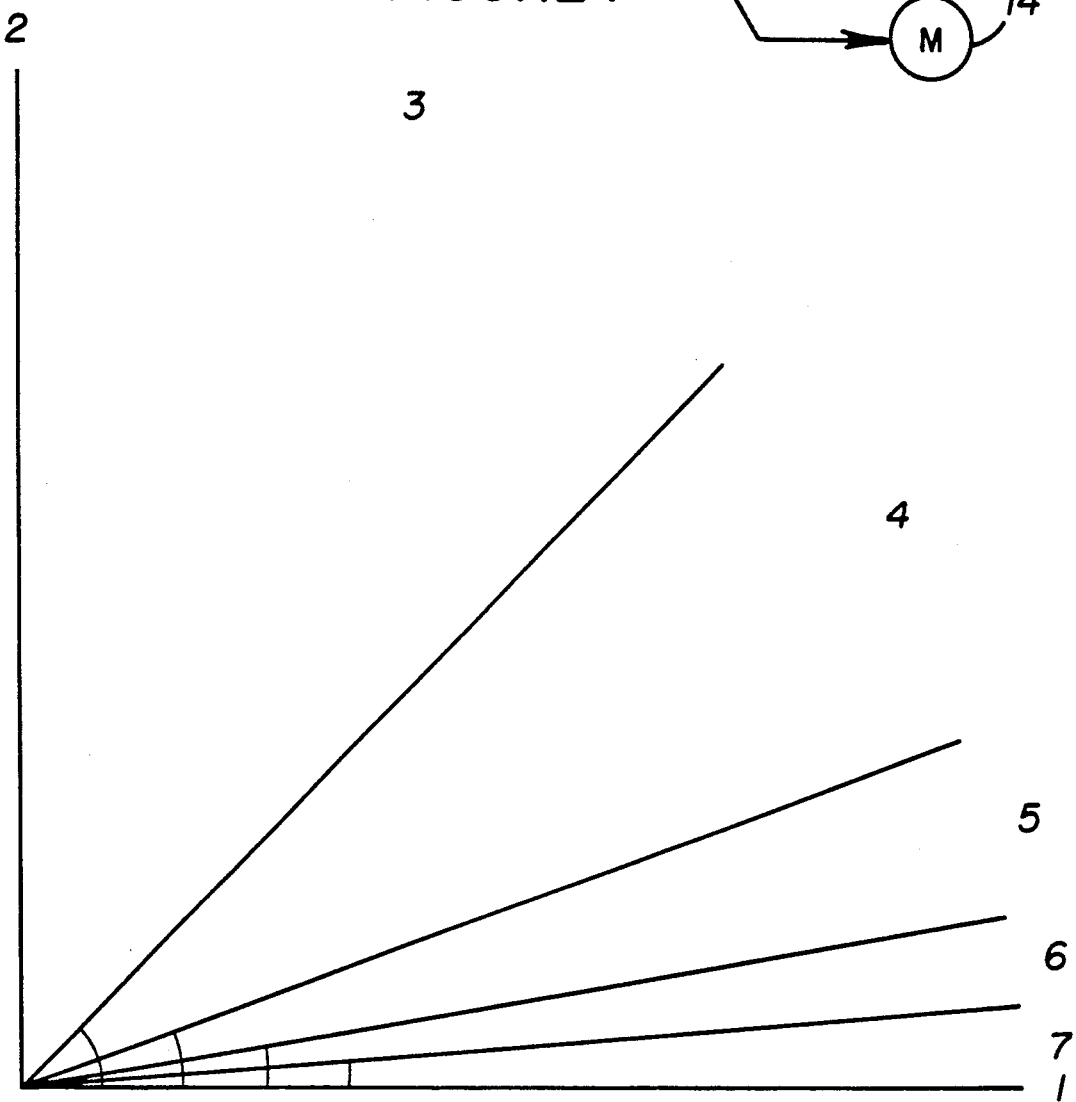
FIG. 5 is a slope classification diagram useful for explaining the invention.

These classifications are depicted in FIG. 5. The choice of the first, second, third and fourth angles for defining the slope classes will depend on the desired level of print quality and the geometries previously described.

The above slope classification scheme is most useful where each group of print lines consists of four print lines (one major print line and three interleaving print lines). In a different embodiment, another slope class could be added for each additional print line available in a group. Also, the use of seven slope classes is considered optimal in a four-print-line-per-group embodiment, but other numbers of slope classes may be used if desired. For example, class 5 may be merged into class 6, leaving only 6 classes. It is considered advantageous, however, if class 3, the vectors within which will be printed using only one dot per group of print lines, includes vectors having a slope equal to or greater than 45° to the print lines.

Dot Designation

After a slope class is assigned to a vector in step 124, dots of the vector are actually designated for print in step 126. This is a simple process of identifying the coordinate positions of the dots on the vector in the band, and designating for print only those which are to be printed for the vector's slope class. For vertical vectors in class 2, this involves designating for print every fourth dot from the highest y position that the vector attains in the band to the lowest, all at the specified horizontal position. Since the vector's upper endpoint and length have been appropriately modified in the endpoint modification step 104, all the dots designated for print will lie on major print lines. Also, for all classes, dots are printed at the full 1/720 inch addressable resolution in the horizontal dimension.

If the vector is in slope class 3, each dot, including the endpoints, will lie on major print lines as well. Only those dots will be designated for print.

If the vector is in slope class 4, every other dot, including the two endpoints of the vector, will be placed on major grid lines with full resolution in the horizontal dimension. Dots of the vector occurring on the third print line of each group of four, half way between the dots on major print lines, are also designated for print.

If the vector is in slope class 5, the first, second and third dots of each group of four dots are designated for print. Due to the endpoint modification step 104, the first of each group of four dots will lie on a major print line.

If the vector is in slope class 6, all dots of the vector are designated for print. The dots will begin and end on major print lines.

The dots of vectors in slope classes 2-6 may be identified using the simple algorithm of repeatedly incrementing the y position and adding Δx to the x position, where Δx indicates the slope as stored in the vector descriptor. For vectors in classes 1 and 7, which require multiple dots per scan line, it is preferable to reverse the independent and dependent axes for the conversion.

Post-Processing and Redundancy Removal

After dots have been designated for print for all the vectors in the band, the entire band may be printed. However, the preferred embodiment first removes certain dots previously designated for print in order to further improve print speed. In particular, each print line is scanned horizontally to determine whether any two dots immediately adjacent to each other are on. If so, one is eliminated. It does not matter which one is eliminated (left or right), as long as the choice is consistent. This algorithm is applied to all the print lines in the band. (Certain prior art printers have a graphics printing mode which will skip printing the second dot to be printed on a print line whenever two dots are placed immediately adjacent each other. These printers are typically bi-directional, however, so the dot which is skipped is not necessarily consistent. Repeatability is therefore compromised, and problems such as color aliasing can result.)

This post-processing algorithm provides significant improvement in print speed where adaptive speed control, described below, is employed. As explained below, adaptive print speed control changes the speed of the printhead in dependence on the density of dots in an upcoming portion of the print pass. If any of the print elements must print two dots very close together, then the head must slow down. However, if no two dots are ever immediately adjacent to each other in the horizontal dimension, then the printhead need never be slowed to its slowest speed. This post-processing algorithm guarantees that condition.

The post-processing step, 140 in FIG. 3, may also perform redundancy removal. Redundancy removal is based on the observation that in any string of three dots, if the outer two dots are nearer to each other than the maximum spacing permissible for the desired level of print quality, then the middle dot is superfluous. In order to understand this algorithm, consider a sequence of seven adjacent dot positions on a line, numbered $-3$, $-2$, $-1$, 0, 1, 2 and 3, respectively. According to the algorithm, if dot 0 has been designated for print, it is eliminated if any of the following conditions hold:

1. Dot $-1$ is on and any of dots 1, 2 or 3 are on;
2. Dot $-1$ or $-2$ is on, and dot $+1$ or $+2$ is on;
3. Dots $-1$, $-2$ or $-3$ are on and dot $+1$ is on.

The above algorithm performs one-dimensional redundancy removal. The algorithm may be extended to two dimensions as follows. Consider a 7×7 square of adjacent dot positions, numbered sequentially 1 through 7 across the top row, 8 through 14 across the second row, and so on to dot numbers 43 through 49 across the bottom row. If any of the following Boolean logic statements is TRUE, then the center dot in the square (dot number 25) is removed as redundant. In these statements, a dot number is TRUE if it is designated for print, FALSE otherwise.

Horizontal
(17 or 24 or 31) and (19 or 20 or 21 or 26 or 27 or 28 or 33 or 34 or 35);
(16 or 23 or 30) and (19 or 20 or 26 or 27 or 33 or 34);
(15 or 22 or 29) and (19 or 26 or 33);
Vertical
(17 or 18 or 19) and (31 or 32 or 33 or 38 or 39 or 40 or 45 or 46 or 47);
(10 or 11 or 12) and (31 or 32 or 33 or 38 or 39 or 40);
(3 or 4 or 5) and (31 or 32 or 33);
Diagonal 1
(10 or 16 or 17) and (33 or 34 or 35 or 40 or 41 or 42 or 47 or 48 or 49);
(3 or 9 or 15) and (33 or 34 or 35 or 40 or 41 or 47);
(1 or 2 or 8) and (33 or 34 or 40);
Diagonal 2
(12 or 19 or 20) and (29 or 30 or 31 or 36 or 37 or 38 or 43 or 44 or 45);

(5 or 13 or 21) and (29 or 30 or 31 or 37 or 38 or 45);
(6 or 7 or 14) and (30 or 31 or 38).

It will be understood that the algorithm may be modified slightly and still be effective. Also, dots should be removed first from the least preferred print lines in each group before removing dots from more preferred print lines.

Different post-processing and redundancy removal algorithms may be used together, either sequentially (in any order) or in a single combined algorithm. If used in sequence, it will be understood that certain simplifications to one or more of them may be possible. Additionally, in two-dimensional dot removal techniques, if there is a choice of which of several dots to remove from different print lines, it is preferable that dots be removed in such a way as to minimize the number of interleaving passes of the printhead as explained above. In the present embodiment, dots are therefore eliminated first from the fourth print line (third interleaving print line) in each group. Next, in order, redundancies are eliminated from the second print line in each group and the third print line in each group, and finally the major print line in each group. This order of elimination serves to concentrate dots in the same rows as does the vector-to-raster converter.

The above-described algorithms are applied separately to each color plane in the band. While color aliasing may pose problems in some dot removal techniques, it has not been found to be a problem in these. Post-processing and redundant dot removal are preferably done in a gate array, but software or other forms of hardware implementations are also possible.

Printing

As previously explained, prior art printers print at a fixed speed consistent with the maximum possible dot density for the selected level of quality. For example, the FUJITSU DL3400 prints all letter quality output at 60 cps (for 10 cpi) or 72 cps (for 12 cpi). It prints all draft quality output at 180 cps (for 10 cpi) and 216 cps (for 12 cpi). It prints all high speed draft quality output at 240 cps (for 10 cpi) or 288 cps (for 12 cpi). The FUJITSU printer is described in more detail in "DL3300/DL3400 Printer Product Description" and "DL3300/DL3400 Printer Maintenance Manual", both copyright 1987 and published by Fujitsu Limited. Both documents are incorporated herein by reference.

In an aspect of the invention, print speed is adaptively controlled depending on the density of dots which are to be printed in an upcoming portion of the print pass. In the preferred embodiment, two fixed speeds plus a seek mode are available. If, in the upcoming portion of the print pass, no pins need to print any dots within a space of about 50 dots, then the carriage is accelerated up toward a rate of 24 inches per second, then decelerated back to the next print speed. This is the logic seeking mode. If dots on any of the print lines being printed are spaced more closely than about 50 dot positions, but not more closely than about 4 dot positions, then the carriage is moved at about six inches per second. If in the upcoming portion of the print pass dots are spaced more closely together than 4 dot positions, but no more closely than two dot positions, then the carriage is moved at three inches per second. A fourth print speed, 1.5 inches per second, is never necessary if the first dot removal algorithm described above is used during post-processing.

To print multiple colors, multiple passes are made for each print line. Also, one or more of the slower print speed choices may be omitted if an extra retrace is permissible. That is, if dots are spaced more closely than some predetermined threshold, only one dot in each set of such dots is printed in a pass. Remaining dots are then printed in a retrace pass over the same print lines.

Figure 6:
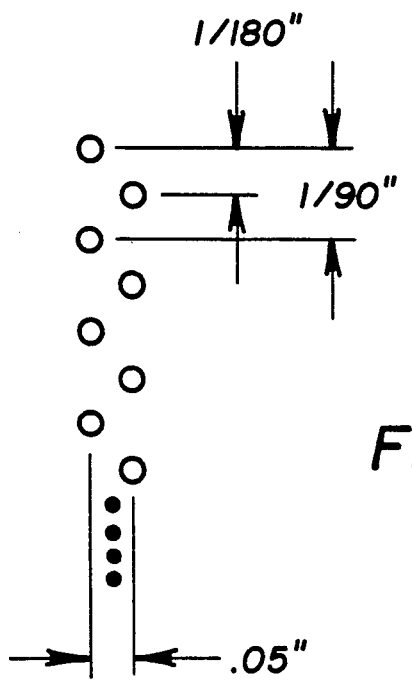
FIG. 6 is a diagram useful for explaining the operation of a printhead.
Figure 7:
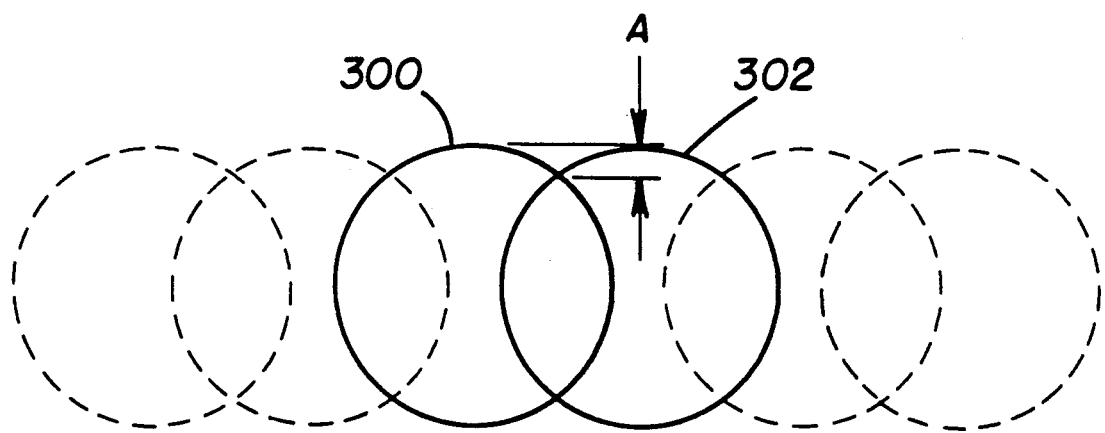
FIG. 7 is an enlarged representation of a row of printed dots.

FIG. 6 shows diagrammatically the head geometry of the printing elements in a typical 24-pin printer. It consists of two vertical columns of twelve pins each, with the two rows being spaced horizontally by about 0.05 inches. The two columns are offset vertically by 1/180 inch, such that the vertical spacing of pins in a single column is 1/90 inches and the spacing overall is 1/180 inches. The printer as manufactured takes the horizontal offset of different pins into account when determining when to fire pins, and the control apparatus for printing a band of dots according to the invention should also take this offset into account.

Calculations for timing when to fire a particular pin are well known and depend on carriage velocity and the delay time between activating a print pin and the time the pin strikes the paper. These calculations can become lengthy if they are to take into account the acceleration and deceleration of the carriage as it switches between print speeds, so the preferred embodiment avoids printing any dots while the carriage is accelerating or decelerating. Since the maximum period for acceleration or deceleration on the printer in the present embodiment is no more that about 0.15 inches of travel, the portion of the upcoming print pass which the apparatus examines in order to choose a print speed may be chosen as the next portion which begins and ends with a vertical column 50 dot positions wide within which none of the print elements need print any dots. In the preferred embodiment, the speed profile for an entire pass is determined before the pass begins.

Set forth in Appendix I is a C language computer program which shows how some aspects of the invention can be implemented in softWare. This implementation is intended for use off-line, prior to any printing and prior to any post-processing or redundancy removal. Appendix II is a C language computer program showing how the first post-processing dot removal algorithm described above may be implemented in software. Appendix III is a C language computer program showing how the one-dimensional redundancy removal algorithm described above can be implemented in software.

The invention has been described with respect to particular exemplary embodiments thereof, and those skilled in the art will readily appreciate that many modifications are possible without materially departing from the novel teachings and advantages of this invention.

For example, though the invention is most useful when used with moving carriage raster-type printers, in which is limited by the moving elements, it will be understood that the invention could also be applied to other forms of raster-type printers and output devices such as CRTs and laser printers. As another example, it will be appreciated that some aspects of the invention can be used with output devices which have continuous dot placement capability in the horizontal dimension. As another example, though the input image in the embodiments described herein is converted to a plurality of vectors before being converted to dot patterns, it will be understood that images could be provided originally to the apparatus in the form of vectors. It will also be understood that more complex image portions, such as curves, could be converted directly to dot patterns using the inventive techniques. As another example, whereas in the embodiments described herein different aspects of the method are accomplished using software, or electrical or mechanical hardware, it will be understood that different aspects of the method may instead be assigned to different ones of these tools. Additionally, though it is preferred that all processing be accomplished in real time, it is also possible to perform some aspects of the method off-line in advance.

With respect to the method itself, it will be understood that different aspects of the method may in some oases be merged together or performed in different sequences. The system may, for example, process one vector completely before beginning on the next, or process parts of many vectors before returning to finish the first; many options are logically available. Various aspects of the process may be pipelined as well, if desired.

Finally, though the various aspects of the invention are most useful when used in conjunction with each other, it will be understood that certain aspects of the invention, for example redundancy removal and adaptive print speed control, would yield important benefits even without the other aspects of the invention. All the above modifications and others are intended to be included within the scope of the invention as defined in the appended claims.

APPENDIX I

COPYRIGHT 1988, 1989 DA VINCI GRAPHICS

```
#include "stdio.h"
#include "fcntl.h"

/*
 * X and Y coordinates divide the plot into three sections.
 * A pictorial view is given below.
 *
 *
 *
 *    PAY3   _____
 *           |                    |
 *    PAY2   |_____|
 *           |                    |
 *    PAY1   |_____|
 *           |                    |
 *    PAY0   |_____|
 *
 *
 */
define _LARGEDATA define X0   0x0000
define X1   0x0800
#define X2   0x1000
#define X3   0x1800
define XE   0xffff define PAY0  0x0000
define PAY1  0x1020
#define PAY2  0x2040
#define PAY3  0x3060         /* 0x2fd0 = 12240 = 17*720;  0x3060 = 17.2" */
define PAYE  0xffff define numvfiles 3             /* number of vector files generated */
define numbfiles 4             /* number of bit image files */
#define bufsize   512           /* size of a vector buffer -- in memory */
#define dotbufsiz (11*720*3*2 + numbfiles*32*3*2)  /* 11" wide; 48 dots, add 96 dots for offset */
#define numcolors   4
#define numstrips   86
#define stripsize   (PAY1/numstrips)    /* size of a strip in vertical dots */
```

```
#define max_x       (11*720)           /* maximum x coordinate value */
#define max_y       (17*720)           /* maximum y coordinate value */
#define bytes_per_row (max_x/8 + numbfiles*4) /* dot buffer bytes per row */
/* #define small_vec_len   24              /* small vector length */
#define   offset_value    27              /* printer dot offset value */

/*
```

WP1/WSW/DVNC/6388.002                   03/01/89
DVNC6388MCF/WSW

```
     *  color code definitions
     *
     *  The order of printing of different colors is as follows:
     *  First Yellow, then Magenta, then Cyan, and then Black.
     *      (Only unidirectional printing)
     */ define YELLOW  1
     #define MAGENTA 2
     #define CYAN    4
     #define BLACK   8
     #define VIOLET  MAGENTA+CYAN
     #define ORANGE  YELLOW+MAGENTA
     #define GREEN   YELLOW+CYAN define COLOR_MASK  0x000f  /* mask for pen color */
     #define CLASS_MASK  0x000f  /* mask for vector class */
     /*
      *  Line Width definitions
      *
      */ define LW1      0x10    /* single dot wide line */
     #define LW2      0x20    /* two dots wide */
     #define LW3      0x30    /* three dots wide */ define LW_MASK 0x00f0  /* mask for line width */
     /*
      *  Pen Selection definitions
      *
      */ define max_pen 24      /* maximum SP code allowed */
     #define min_pen 1       /* minimum SP code allowed */

/*
      *  Slope Class definitions and codes
      *
      */ define class1  1           /* slope class 1 -- vertical line */
     #define class2  2           /* slope class 2 -- horizontal line */
     #define class3  3           /* slope class 3 -- >= 45 and < 90 */
     #define class4  4           /* slope class 4 -- >= 20 and < 45 */
     #define class5  5           /* slope class 5 -- >= 15 and < 20 */
```

```
#define class6   6            /* slope class 6 -- >= 11 and < 17 */
define class7   7            /* slope class 7 -- >= 0 and < 11 */ define DECREMENT    0x80     /* X decreases as Y decreases */
define class1lmt    0        /* class 1 limit check value */
#define class2lmt    0        /* class 2 limit check value */
#define class3lmt    0        /* class 3 limit check value */
```

WP1/WSW/DVNC/6388.002                    03/01/89
DVNC6388MCF/WSW

```
#define class4lmt   23853    /* class 4 limit check value - slope fraction */
#define class5lmt   15555    /* class 5 limit check value - slope fraction */
#define class6lmt   10400    /* class 6 limit check value - slope fraction */
#define class7lmt   0        /* class 7 limit check value */

/*
 * Variable definitions
 *
 */ extern int errno;

char vfilename[13];          /* vector file name string */
FILE *hpglfile;
int  vfp[numvfiles];         /* vector file pointers */ int  limits[numvfiles] = {   /* Y coordinate limits for vector files */
                PAY2, PAY1, PAY0 };

int  pendef[max_pen+1] = {   /* pen color and width definitions */
                0,
                BLACK+LW1, MAGENTA+LW1, CYAN+LW1, GREEN+LW1,
                VIOLET+LW1, ORANGE+LW1, YELLOW+LW1, BLACK+LW3,
                BLACK+LW2, MAGENTA+LW2, CYAN+LW2, YELLOW+LW2,
                VIOLET+LW2, ORANGE+LW2, GREEN+LW2, BLACK+LW2,
                BLACK+LW3, MAGENTA+LW3, CYAN+LW3, YELLOW+LW3,
                VIOLET+LW3, ORANGE+LW3, GREEN+LW3, BLACK+LW3 };
unsigned char MASK_TBL[8] = {   /* bit mask table */
                0x80, 0x40, 0x20, 0x10, 0x08, 0x04, 0x02, 0x01 };

struct vector { unsigned int   startx;
                unsigned int   starty;
                unsigned int   length;
                unsigned int   slope_whole;
                unsigned int   slope_fraction;
                unsigned char  class;
                unsigned char  color;
                unsigned int   slope_remainder;
                unsigned int   flag;
        };

unsigned int   vfindex[numvfiles];    /* index variables into vector file buffers
*/
#define vecs_in_buf (bufsize/sizeof(struct vector))  /* number of vectors in buf */
struct vbuffer {
```

```
                struct vector vectors[vecs_in_buf];
            } vbuffers[numvfiles];      /* memory vector buffers */
unsigned int   num_vectors;             /* number of vectors read */
unsigned int   pen_state, ignore_flag;
unsigned int   x1_user, y1_user, x2_user, y2_user, x2_last, y2_last;
unsigned int   curpen;                  /* current pen code */
unsigned int   linewidth;               /* current line width */
```

WP1/WSW/DVNC/6388.002                    03/01/89
DVNC6388MCF/WSW

```
    unsigned int  namelen;              /* length of the file name */
    int read_rslt, write_rslt;
    unsigned char local_buf[24*1024];    /* needed [24*1006] */
    unsigned char bit_cmd_buf[24*1024];  /* needed [24*1006] */
    int small_vec_len;                       /* minimum length for snapping */
    int snap_count = 0;                      /* number of vectors snapped */

/* variables for rasterization */

/* number of strips per vector file. Each vector file covers 4128 (0x1020)
       vertical dots. Each dot file covers 48 (0x30) vertical dots. Hence there
       are 86 (0x56) strips for each vector file. There are 4 colors, and these
       four color dots are written to the same strip file. So there are a total
       of up to 86 dot files generated per vector file, or a maximum of 258 (86*3)
       files per plot. The name extensions generated for dot files are:

first digit          --> '0' thru '2'     (vector file)
            second digit and third digit     --> '00' thru '85'   (strip code)
    */ char *dot_buffer[numcolors];        /* dot buffers for 4 primary colors */

/*
     * Function and procedure declarations
     *
     */ void build_vector_list();
    void do_in();
    void do_sc();
    void do_sp();
    void do_ci();
    void do_pa();
    void do_pr();
    void save_cursor();
    void restore_cursor();
    void update_cursor();
    void scale_point();
    void add_vector();
    int  skip_blanks();
    void scale_vector_list();
    void rasterize();
    void close_vector_files();
    void update_if_full();
    void set_bits();
    char *malloc();
```

```
    int free();
    char *index();
    long int lseek();
    double sqrt();
    double pow();
    int get_vfile();
```

WP1/WSW/DVNC/6388.002                               03/01/89
DVNC6388MCF/WSW

```
    /*
     * Main Program
     *
     */ main( argc, argv )
        int argc;
        char *argv[];
    {
        int i, j;

if ( argc < 2 ) {
            printf( "Usage: %s file\n", argv[0] );
            printf( "file is a text file containing HPGL plot commands\n" );
            exit( 1 );
            }
        if (argc > 2)
            small_vec_len = atoi(argv[2]);
        if (small_vec_len)
            printf("snapping all vectors with dy or dx greater than %d\n",
    small_vec_len);
        else
            printf("no snapping being performed on vectors...\n");

if ( (hpglfile = fopen(argv[1], "r")) == NULL) {
            printf( "Unable to open file %s -- aborted\n", argv[1] );
            exit( 1 );
            }
        strcpy(vfilename, argv[1]);
        if (index(vfilename, '.') != 00)
            *index(vfilename, '.') = '\0';
        strcat(vfilename, ".");
        namelen = strlen(vfilename);
        for (i = 0; i <numvfiles; i++) {
            vfilename[namelen] = 'A' + i;
            vfilename[namelen+1] = '\0';
            if ( (vfp[i] = creat(vfilename, O_WRONLY)) == -1 ) {
                printf( "Unable to create vector file %s! -- aborted\n",vfilename );
                exit(1);
                }
            } build_vector_list();
        fclose( hpglfile );
        close_vector_files();
        printf( "Total vectors read = %u\n", num_vectors );
        rasterize();
```

```
        return( 0 );
    } void build_vector_list()
    {
        int    c1, c2, ignore_flag;

do_in();    /* Assume an "IN" command first */
        for ( ; ; ) {
        do {
            c1 = getc( hpglfile );
            if ( c1 == EOF )
                return;
            if ( c1 >= 'a' )
                c1 -= 'a'-'A';
        } while ( (c1 < 'A') || (c1 > 'Z') );
        do {
            c2 = getc( hpglfile );
            if ( c2 == EOF )
                return;
            if ( c2 >= 'a' )
                c2 -= 'a'-'A';
        } while( c2 <= ' ' );
        ignore_flag = 0;
        switch( c1 ) {
            case 'C':
                switch( c2 ) {
                    case 'I':
                        do_ci();
                        break;
                    default:
                        ignore_flag = 1;
                }
                break;
            case 'I':
                switch( c2 ) {
                    case 'N':
                        do_in();
                        break;
                    default:
                        ignore_flag = 1;
                }
                break;
            case 'P':
                switch( c2 ) {
                    case 'A':
                        do_pa();
                        break;
                    case 'R':
                        do_pr();
                        break;
                    case 'U':
                        pen_state = 0;
```

```
                        do_pa();
                        break;
                    case 'D':
                        pen_state = 1;
                        do_pa();
                        break;
                    default:
                        ignore_flag = 1;
                        break;
                }
                break;
            case 'S':
                switch( c2 ) {
                    case 'C':
                        do_sc();
                        break;
                    case 'P':
                        do_sp();
                        break;
                    default:
                        ignore_flag = 1;
                        break;
                }
                break;
            default:
                ignore_flag = 1;
                break;
        }
        if( ignore_flag )
            printf( "**** Ignoring HPGL command %c%c!\n", c1, c2 );
    }
}

/*
 * IN command
 */
void do_in()
{
    int i;

pen_state = 0;                              /* pen up */
    curpen = pendef[1] & COLOR_MASK;            /* default pen is pen 1 */
    linewidth = pendef[1] & LW_MASK;            /* default line width */
    num_vectors = 0;
    x1_user = y1_user = x2_user = y2_user = 0;
    for (i = 0; i < numvfiles; i++)
        vfindex[i] = 0;
}

/*
 * SC command
 */
void do_sc()
```

```
{
        printf( "**** Ignoring HPGL command SC!\n");
    }

/*
 *  SP command
 */
void do_sp()
{
    int *i;

get_int(i);
    if ((*i > max_pen) || (*i <min_pen)) {
       if (*i)
          printf( "Illegal SP command  %d -- ignored\n", *i );
       }
    else {
        curpen = pendef[*i] & COLOR_MASK;
        linewidth = pendef[*i] & LW_MASK;
        }
}

/*
 *  CI command
 */
void do_ci()
{
        printf( "**** Ignoring HPGL command CI!\n");
}

/*
 *  PR command
 */
void do_pr()
{
        printf( "**** Ignoring HPGL command PR!\n");
}

/*
 *  PA command
 */
void do_pa()
{
    while( get_int(&x2_user) ) {
        if( !get_int(&y2_user) ) {
            printf( "**** Illegal number of parameters for pa!\n" );
            return;
            }
        /* If the pen is down, enter a vector */
        x2_last = x2_user;
        y2_last = y2_user;
        if( pen_state )
            add_vector();
```

```c
            update_cursor();
        }
    }
    int get_vfile(t)
    int t;
    {
        if (t >= PAY3) {
            printf(" Too large Y coordinate (%d) in PA command -- aborted.",
                            t);
            exit(1);
            }
        else if (t >= PAY2)
            return (2);
        else if (t >= PAY1)
            return (1);
        else if (t < 0) {
            printf(" Negative Y coordinate in PA command -- aborted.");
            exit(1);
            }
        else
            return (0);
    }
    /* Add a vector to the vector list */
    void add_vector()
    {
        int deltax, deltay, length, type, t, class, vfile;
        int lwdx = 0;
        int lwdy = 0;
        float fltslp = 0.0;
        int full_slope = 0;
        unsigned int frac_slope = 0;
        unsigned int real_slope = 0;

/* normalize to HP plotter plug compatibility */ x1_user = (int) (x1_user * 0.71);
        x2_user = (int) (x2_user * 0.71);
        y1_user = (int) (y1_user * 0.71);
        y2_user = (int) (y2_user * 0.71);

num_vectors++;
        if (y1_user < y2_user) {        /* swap so y1_user >= y2_user */
            t = y2_user;
            y2_user = y1_user;
            y1_user = t;
            t = x2_user;
            x2_user = x1_user;
            x1_user = t;
            };

deltax = x2_user - x1_user;
```

```
        deltay = y1_user - y2_user;
        class = 0;
        vfile = 0;
        if (deltax < 0 ) {
            deltax = -deltax;
            class |= DECREMENT;
            };

/* calculate lwdx and lwdy for LW2 and LW3 lines */ if (deltax == 0) {          /* vertical line */
            if (linewidth == LW2)
                lwdx = 2;
            else if (linewidth == LW3)
                lwdx = 4;
            }
        else {
            fltslp = (float)deltay/(float)deltax;
            if (linewidth == LW2) {
                if (fltslp < 0.57)
                    lwdy = 2;
                else if (fltslp < 1.6) {
                    lwdy = 2;
                    lwdx = 1;
                    }
                else
                    lwdx = 2;
                }
            else if (linewidth == LW3) {
                if (fltslp < 0.32)
                    lwdy = 4;
                else if (fltslp < 1.0) {
                    lwdy = 4;
                    lwdx = 1;
                    }
                else if (fltslp < 1.33) {
                    lwdy = 4;
                    lwdx = 2;
                    }
                else if (fltslp < 2.05) {
                    lwdx = 5;
                    }
                else
                    lwdx = 4;
                }
            }

/* perform snapping (endpoint modification) */ if (small_vec_len) {
        if (((deltay > deltax) ? deltay : deltax) > small_vec_len) {
            if (linewidth != LW2) {
```

```
                y1_user = (y1_user + 2) & 0xfffc;
                y2_user = (y2_user + 2) & 0xfffc;
                }
            else { /* linewidth == LW2 */
                if (fltslp < 1.6) {
                    y1_user = (y1_user & 0xfffe) | 0x0002;
                    y2_user = (y2_user & 0xfffe) | 0x0002;
                    }
                else {
                    y1_user = (y1_user + 2) & 0xfffc;
                    y2_user = (y2_user + 2) & 0xfffc;
                    }
                }
            }
        }
    if (deltay != (y1_user - y2_user))
        snap_count++;
    deltay = y1_user - y2_user;
    length = deltay;

/* determine class */ if (deltax == 0) {          /* vertical line */
        class |= class1;
        }
    else if (deltay == 0) {     /* horizontal line */
        class |= class2;
        length = deltax;
        }
    else {
        if (deltay >= deltax) {     /* slope >= 45 degrees */
            class |= class3;
            full_slope = deltax/deltay;
            frac_slope = ((long) deltax << 16) / deltay;
            }
        else {
                full_slope = deltax / deltay;
                frac_slope = ((long) (deltax % deltay) << 16) / deltay;
                real_slope = ((long) deltay << 16) / deltax;
                if (real_slope > class4lmt)    /* slope >= 20 degrees */
                    class |= class4;
                else if (real_slope > class5lmt)    /* slope >= 10 degrees */
                    class |= class5;
                else if (real_slope > class6lmt)    /* slope >= 5 degrees */
                    class |= class6;
                else {                              /* class 7 special case */
                    class |= class7;
                    full_slope = 0;
                    frac_slope = real_slope;
                    length = deltax;                /* length is horizontal */
                    }
                }
            }
```

```c
}

/* set vector buffers and write to the disk files */ if ((linewidth == LW1) || (linewidth == LW3)) {
    vfile = get_vfile(y1_user);
    vbuffers[vfile].vectors[vfindex[vfile]].startx = x1_user;
    vbuffers[vfile].vectors[vfindex[vfile]].starty = y1_user;
    vbuffers[vfile].vectors[vfindex[vfile]].length = length;
    vbuffers[vfile].vectors[vfindex[vfile]].slope_whole = full_slope;
    vbuffers[vfile].vectors[vfindex[vfile]].slope_fraction = frac_slope;
    vbuffers[vfile].vectors[vfindex[vfile]].class = class;
    vbuffers[vfile].vectors[vfindex[vfile]].color = curpen;
    vbuffers[vfile].vectors[vfindex[vfile]].flag = 0xffff;

/* update index and write to disk if buffer full */

(vfindex[vfile])++;
    update_if_full(vfile);
    }
else if (linewidth == LW2) {
    if (class & DECREMENT)
        t = y1_user - lwdy;
    else
        t = y1_user + lwdy;
    vfile = get_vfile(t);
    vbuffers[vfile].vectors[vfindex[vfile]].startx = x1_user + lwdx;
    vbuffers[vfile].vectors[vfindex[vfile]].starty = t;
    vbuffers[vfile].vectors[vfindex[vfile]].length = length;
    vbuffers[vfile].vectors[vfindex[vfile]].slope_whole = full_slope;
    vbuffers[vfile].vectors[vfindex[vfile]].slope_fraction = frac_slope;
    vbuffers[vfile].vectors[vfindex[vfile]].class = class;
    vbuffers[vfile].vectors[vfindex[vfile]].color = curpen;
    vbuffers[vfile].vectors[vfindex[vfile]].flag = 0xffff;

/* update index and write to disk if buffer full */

(vfindex[vfile])++;
    update_if_full(vfile);

if (class & DECREMENT)
        t = y1_user + lwdy;
    else
        t = y1_user - lwdy;
    vfile = get_vfile(t);
    vbuffers[vfile].vectors[vfindex[vfile]].startx = x1_user - lwdx;
    vbuffers[vfile].vectors[vfindex[vfile]].starty = t;
    vbuffers[vfile].vectors[vfindex[vfile]].length = length;
    vbuffers[vfile].vectors[vfindex[vfile]].slope_whole = full_slope;
    vbuffers[vfile].vectors[vfindex[vfile]].slope_fraction = frac_slope;
    vbuffers[vfile].vectors[vfindex[vfile]].class = class;
    vbuffers[vfile].vectors[vfindex[vfile]].color = curpen;
```

```c
            vbuffers[vfile].vectors[vfindex[vfile]].flag = 0xffff;

/* update index and write to disk if buffer full */

(vfindex[vfile])++;
            update_if_full(vfile);
            }
        else {
            printf(" Illegal line width %d -- aborted \n", linewidth);
            exit(1);
            }
        if (linewidth == LW3) {
            if (class & DECREMENT)
                t = y1_user - lwdy;
            else
                t = y1_user + lwdy;
            vfile = get_vfile(t);
            vbuffers[vfile].vectors[vfindex[vfile]].startx = x1_user + lwdx;
            vbuffers[vfile].vectors[vfindex[vfile]].starty = t;
            vbuffers[vfile].vectors[vfindex[vfile]].length = length;
            vbuffers[vfile].vectors[vfindex[vfile]].slope_whole = full_slope;
            vbuffers[vfile].vectors[vfindex[vfile]].slope_fraction = frac_slope;
            vbuffers[vfile].vectors[vfindex[vfile]].class = class;
            vbuffers[vfile].vectors[vfindex[vfile]].color = curpen;
            vbuffers[vfile].vectors[vfindex[vfile]].flag = 0xffff;

/* update index and write to disk if buffer full */

(vfindex[vfile])++;
            update_if_full(vfile);

if (class & DECREMENT)
                t = y1_user + lwdy;
            else
                t = y1_user - lwdy;
            vfile = get_vfile(t);
            vbuffers[vfile].vectors[vfindex[vfile]].startx = x1_user - lwdx;
            vbuffers[vfile].vectors[vfindex[vfile]].starty = t;
            vbuffers[vfile].vectors[vfindex[vfile]].length = length;
            vbuffers[vfile].vectors[vfindex[vfile]].slope_whole = full_slope;
            vbuffers[vfile].vectors[vfindex[vfile]].slope_fraction = frac_slope;
            vbuffers[vfile].vectors[vfindex[vfile]].class = class;
            vbuffers[vfile].vectors[vfindex[vfile]].color = curpen;
            vbuffers[vfile].vectors[vfindex[vfile]].flag = 0xffff;

/* update index and write to disk if buffer full */

(vfindex[vfile])++;
            update_if_full(vfile);
            }
}
```

```c
void update_if_full(vfile)
int vfile;
{
    if (vfindex[vfile] == vecs_in_buf) {
        if (((write_rslt = write (vfp[vfile], vbuffers[vfile].vectors,
            vfindex[vfile]*sizeof(struct vector))) == -1) || !write_rslt) {
                printf( "Unable to write to vector file # %d! -- aborted\n",
                                vfile );
                exit(1);
            }
        vfindex[vfile] = 0;              /* reset buffer */
        }
} int skip_blanks()
{
    register int c;
    for ( ; ; ) {
        c = getc(hpglfile);
        if ( c == EOF ) break;
        if ( c <= ' ' ) continue;
        if ( c == ',' ) continue;
        break;
        }
    return c;
} int get_int( p )
    int *p;
{
    int c, sign;
    sign = 0;
    *p = 0;
    c = skip_blanks();
    while ( (c=='-') || (c=='+') ) {
        if ( c=='-' )
            sign = !sign;
        c = skip_blanks();
        }
    if( (c >= '0') && (c <= '9') ) {
        *p = c & 0xf;
        while ( ((c = getc(hpglfile)) >= '0') && (c <= '9') ) {
            *p = *p * 10 + (c & 0xf);
            }
        if( c != EOF )
            ungetc( c , hpglfile );
        return( 1 );
        }
    else {
        ungetc( c , hpglfile );
        return( 0 );
        }
```

```c
/*======== Rasterization section ==========*/ void rasterize()
{
    unsigned int i, j, k;
    int vecfp, vecfp1;
    int dfp;                /* dot file pointer */
    int dot_buf_valid = 1;  /* dot buffer validation flags */
    struct vector curvec;   /* vector being processed */
    int curstrip;           /* current strip number */
    int curvfile;           /* vector file being processed */
    int y_top, y_bottom;    /* top and bottom y-coordinates for strip */
    int x_offset, y_offset, length;
    unsigned int d_offset;
    unsigned char d_mask, color;
    unsigned int slope_whole, slope_fraction, slope_remainder, class;
    unsigned int direction;

printf("Performing vector to raster conversion ....\n");
    num_vectors = 0;
    for (i = 0; i < numcolors; i++) {   /* allocate 4 color dot buffers */
        if (!(dot_buffer[i] = malloc(dotbufsiz))) { /* 11" wide; 48 dots */
            printf("Memory not available -- aborted\n");
            exit(1);
        }
    }

/* process one vector file at a time, starting at the top */ for (curvfile = numvfiles - 1; curvfile >= 0; curvfile--) {
        vfilename[namelen] = 'A' + curvfile;    /* vector file name */
        vfilename[namelen + 1] = '\0';
        if ( (vecfp = open(vfilename, O_RDWR)) == -1 ) {
            printf( "Unable to open vector file %s -- aborted\n", vfilename);
            exit( 1 );
        }
        if (curvfile) { /* overflow/unsatisfied possible */
            vfilename[namelen] = 'A' + curvfile-1;   /* vector file name */
            vfilename[namelen + 1] = '\0';
            if ( (vecfp1 = open(vfilename, O_WRONLY + O_APPEND)) == -1 ) {
                printf( "Unable to open overflow vector file %s -- aborted\n",
vfilename);
                exit( 1 );
            }
        }

/* process one strip at a time, starting at the top */ for (curstrip = numstrips - 1; curstrip >= 0; curstrip--) {
            vfilename[namelen] = '0' + curvfile;             /* vector tag */
```

```
vfilename[namelen + 1] = '0' + curstrip / 10;    /* strip tag */
vfilename[namelen + 2] = '0' + curstrip % 10;    /* strip tag */
vfilename[namelen + 3] = '\0';                    /* terminator */
if ( (dfp = creat(vfilename, O_WRONLY)) == -1 ) {
    printf( "Unable to create dot file %s -- aborted\n", vfilename);
    exit( 1 );
    }

/* vector processing initialization */ y_bottom = (curvfile*PAY1) + (curstrip*stripsize);
y_top = y_bottom + stripsize;
if (dot_buf_valid) {           /* if something in dot buffers */
    dot_buf_valid = 0;         /* nothing in dot buffers */
    for (i = 0; i < numcolors; i++) {
        for (j = 0; j < dotbufsiz; j++) {
            *((char *)dot_buffer[i] + j) = '\0';
            }
        }
    }

/* now read and process one vector at a time from the file */ while (((read_rslt =
            read(vecfp, &curvec, sizeof(struct vector))) != -1) &&
            (read_rslt != 0)) {

/* process for this strip */ if (curvec.flag && (curvec.length >= 0) &&
            (curvec.starty >= y_bottom)) {
        /* a valid vector to process */
        y_offset = curvec.starty - y_bottom;
        x_offset = curvec.startx;
        length = curvec.length;
        slope_whole = curvec.slope_whole;
        slope_fraction = curvec.slope_fraction;
        slope_remainder = curvec.slope_remainder;
        class = curvec.class & CLASS_MASK;
        direction = curvec.class & (~CLASS_MASK);
        color = curvec.color;
        if (class != class7) {
            if (curvec.length > y_offset)
                curvec.length -= y_offset;   /* new length to process */
            else
                curvec.flag = 0;              /* no processing next time */
            }
        dot_buf_valid = 1;
        switch (class) {
            case class1:        /* vertical line */
                    while ((y_offset >= 0) && (length >= 0)) {
                        set_bits(x_offset, y_offset, color);
```

```
                y_offset -= 4;
                length -= 4;
                }
            curvec.starty = y_bottom-4;
            curvec.length -= 4;
            break;

case class2:            /* horizontal line */
            while (length >= 0) {
                set_bits(x_offset, y_offset, color);
                if (direction)
                    x_offset -= 4;
                else
                    x_offset += 4;
                length -= 4;
                }
            curvec.flag = 0;    /* all processed */
            break;

case class3:
            while ((y_offset >= 0) && (length >= 0)) {
                set_bits(x_offset, y_offset, color);
                y_offset -= 4;
                length -= 4;
                j = (slope_whole * 4) +
                    ((((long)slope_fraction * 4) +
                    (long)slope_remainder) / 0x10000L);
                k = ((((long)slope_fraction * 4) +
                    (long)slope_remainder) & 0xffff);
                slope_remainder = k;
                if (direction)
                    x_offset -= j;
                else
                    x_offset += j;
                }
            curvec.slope_remainder = slope_remainder;
            curvec.starty = y_bottom - 4;
            curvec.startx = x_offset;
            curvec.length -= 4;
            break;

case class4:
            while ((y_offset >= 0) && (length >= 0)) {
                set_bits(x_offset, y_offset, color);
                y_offset -= 2;
                length -= 2;
                j = (slope_whole * 2) +
                    ((((long)slope_fraction * 2) +
                    (long)slope_remainder) / 0x10000L);
                k = ((((long)slope_fraction * 2) +
                    (long)slope_remainder) & 0xffff);
                slope_remainder = k;
```

```
                    if (direction)
                        x_offset -= j;
                    else
                        x_offset += j;
                }
                curvec.slope_remainder = slope_remainder;
                curvec.starty = y_bottom - 2;
                curvec.startx = x_offset;
                curvec.length -= 2;
                break;

case class5:
                while ((y_offset >= 0) && (length >= 0)) {
                    set_bits(x_offset, y_offset, color);
                    if ((y_offset && 0x0003) == 02)
                        i = 2;      /* skip third pass */
                    else
                        i = 1;      /* do 1,2,4 passes */
                    y_offset -= i;
                    length -= i;
                    j = (slope_whole * i) +
                      ((((long)slope_fraction * i) +
                         (long)slope_remainder) / 0x10000L);
                    k = ((((long)slope_fraction * i) +
                         (long)slope_remainder) & 0xffff);
                    slope_remainder = k;
                    if (direction)
                        x_offset -= j;
                    else
                        x_offset += j;
                }
                curvec.slope_remainder = slope_remainder;
                curvec.starty = y_bottom - 1;
                curvec.startx = x_offset;
                curvec.length -= 1;
                break;

case class6:
                while ((y_offset >= 0) && (length >= 0)) {
                    set_bits(x_offset, y_offset, color);
                    y_offset--;
                    length--;
                    j = slope_whole +
                      (((long)slope_fraction +
                         (long)slope_remainder) / 0x10000L);
                    k = (((long)slope_fraction +
                         (long)slope_remainder) & 0xffff);
                    slope_remainder = k;
                    if (direction)
                        x_offset -= j;
                    else
                        x_offset += j;
```

```
                    }
                    curvec.slope_remainder = slope_remainder;
                    curvec.starty = y_bottom - 1;
                    curvec.startx = x_offset;
                    curvec.length -= 1;
                    break;

case class7:
                    do {
                        set_bits(x_offset, y_offset, color);
                        if (direction)
                            x_offset -= 4;
                        else
                            x_offset += 4;
                        length -= 4;
                        j = ((((long)slope_fraction * 4) +
                                (long)slope_remainder) / 0x10000L);
                        k = ((((long)slope_fraction * 4) +
                                (long)slope_remainder) & 0xffff);
                        slope_remainder = k;
                        y_offset -= j;
                    } while ((y_offset>=0) && (length>=0));

curvec.slope_remainder = slope_remainder;
                    curvec.starty = y_bottom-1;
                    curvec.startx = x_offset -4;
                    if (length > 0)
                        curvec.length = length;      /* new length to process */
                    else
                        curvec.flag = 0;             /* no processing next time */
                    break;

default:  printf ("Illegal class code %d -- aborted\n", class);
                      exit(1);
                      break;
            }

/* update vector back in file --
                          processed/more for next strip */ if (lseek(vecfp, -0x10L, 1) == -1) {
                printf ("Error in positioning vector file -- aborted\n");
                exit(1);
            }
            if (((write_rslt = write(vecfp, &curvec, sizeof(struct vector))) == -1) || !write_rslt) {
                printf ("Error in updating vector file -- aborted\n");
                exit(1);
            }
```

```c
                        /* append to overflow file if necessary */
                        if (!curstrip && curvfile && curvec.flag) {
                                if (((write_rslt = write(vecfp1, &curvec, sizeof(struct
vector))) == -1) || !write_rslt) {
                                        printf ("Error in updating overflow vector file --
aborted\n");
                                        printf("errno = %d \n", errno);
                                        exit(1);
                                        }
                                }
                        } .
                }       /* end while */ if(read_rslt == -1) {
                printf( "Error reading vector file while processing -- aborted\n");
                exit( 1 );
                }
            else { /* rewind it for the next strip */
                if (lseek(vecfp, 0L, 0) == -1) {
                    printf ("Error in rewinding vector file -- aborted\n");
                    exit(1);
                    }
                }

/* write to and close dot files as ready to go to next strip */ if (dot_buf_valid) {
                for (j = 0; j < numcolors; j++) {
                    if (((write_rslt = write (dfp, dot_buffer[j], dotbufsiz)) ==
-1) || !write_rslt) {
                        printf( "Unable to write to dot buffer file # %s! --
aborted\n",
                                    vfilename);
                        exit(1);
                        }
                    }
                }
            if (close(dfp)) {
                printf("Unable to close dot file %s -- aborted\n", vfilename);
                exit(1);
                }
            } /* end for (one strip at a time) */
        if (curvfile) {
            if (close(vecfp1)) {         /* now close overflow vector file */
            printf("Unable to close overflow vector file after processing --
aborted\n");
            exit(1);
            }
        }
        if (close(vecfp)) {              /* now close this vector file */
            printf("Unable to close vector file after processing -- aborted\n");
            exit(1);
```

```c
            } /* end for (one vector file at a time) */
        }
        for (i = 0; i < numcolors; i++) {    /* free dot buffers */
            if (free(dot_buffer[i]) == -1) {
                printf("Error freeing memory -- aborted\n");
                exit(1);
                }
            }
        printf("Number of vectors snapped = %d\n", snap_count);
        printf("Vector to raster conversion completed ....\n");
} void set_bits(x_offset, y_offset, color)
unsigned int x_offset, y_offset;
unsigned char color;
{
    unsigned int d_offset, ov_offset;
    unsigned char d_mask;

if (x_offset >= 3*1980)
        ov_offset = 3*((offset_value/8) + 1);
    else if (x_offset >= 2*1980)
        ov_offset = 2*((offset_value/8) + 1);
    else if (x_offset >= 1980)
        ov_offset = (offset_value/8) + 1;
    else
        ov_offset = 0;
    if (!((y_offset/4) % 2))
        x_offset += offset_value;
    d_mask = MASK_TBL[x_offset % 8];
    d_offset = ((stripsize-1-y_offset)*bytes_per_row) + x_offset/8 + ov_offset;
    if (d_offset >= dotbufsiz) {
        printf("Error in dot buffer offset calculation %x -- aborted\n", d_offset);
        printf("x_offset = %d, y_offset = %d\n", x_offset, y_offset);
        exit(1);
        }
    if (color & YELLOW)                                    /* 1st yellow */
        *((char *)dot_buffer[0] + d_offset) |= d_mask;
    if (color & MAGENTA)                                   /* 2nd magenta */
        *((char *)dot_buffer[1] + d_offset) |= d_mask;
    if (color & CYAN)                                      /* 3rd cyan */
        *((char *)dot_buffer[2] + d_offset) |= d_mask;
    if (color & BLACK)                                     /* 4th black */
        *((char *)dot_buffer[3] + d_offset) |= d_mask;
} void update_cursor()
{
    /* Set the new starting point for the vector */ x1_user = x2_last;
    y1_user = y2_last;
```

```
void close_vector_files()
{
    int vfile;

for (vfile = 0; vfile < numvfiles; vfile++) {
        if (vfindex[vfile]) {
            if (((write_rslt = write (vfp[vfile], vbuffers[vfile].vectors,
                vfindex[vfile]*sizeof(struct vector))) == -1) || !write_rslt) {
                printf( "Unable to write to vector file # %d! -- aborted\n",
                                vfile );
                exit(1);
                }
            }
        if (close(vfp[vfile])) {         /* now close this file */
            printf( "Unable to close vector file # %d! -- aborted\n", vfile );
            exit(1);
            }
        }
}
```

APPENDIX II

COPYRIGHT 1988, 1989 DA VINCI GRAPHICS

```
#include "rrs.c"

/*
 * Main Program
 *
 */ main( argc, argv )
    int argc;
    char *argv[];
{
    int i, j;

if ( argc < 2 ) {
        printf( "Usage: %s file\n", argv[0] );
        printf( "file is a plot file name\n" );
        exit( 1 );
        }
    strcpy(vfilename, argv[1]);
    if (index(vfilename, '.') != 00)
        *index(vfilename, '.') = '\0';
    strcat(vfilename, ".");
    namelen = strlen(vfilename);
 elchporr(argc, argv);
    return( 0 );
}
```

APPENDIX III

COPYRIGHT 1988, 1989 DA VINCI GRAPHICS

```
#include "rrs.c"

/*
 * Main Program
 *
 */ main( argc, argv )
    int argc;
    char *argv[];
{
    int i, j;

if ( argc < 2 ) {
        printf( "Usage: %s file\n", argv[0] );
        printf( "file is a plot file name\n" );
        exit( 1 );
    }
    strcpy(vfilename, argv[1]);
    if (index(vfilename, '.') != 00)
        *index(vfilename, '.') = '\0';
    strcat(vfilename, ".");
    namelen = strlen(vfilename);
    horizrr(argc, argv);
    return( 0 );
}
```

What is claimed is:

1. A method for converting a plurality of operating vectors for printing on an output device having a plurality of print lines, comprising the steps of:

designating for print dots of said operating victors, which dots occur on any of the print lines nk, where n is a predetermined number of lines in a group and k is any integer; and designating for print dots of only those of said operating vectors having a slope smaller than a predetermined first angle to the print lines, which dots occur on any of the print lines $nk+m_1$, where n is said predetermined number of lines in a group, $m_1$ is a first predetermined integer between 0 and n exclusive, and k is any integer, wherein said first angle is less than or equal to 45°.

2. A method according to claim 1, wherein n is a multiple of 2 and $m_1 = n/2$.

3. A method according to claim 1, further comprising the step of deriving each of said operating vectors in said plurality of operating vectors from a respective one of a plurality of input vectors, said step of deriving comprising the endpoint modification step of modifying a subset of said input vectors such that at least one of the end points of each vector in said subset occurs on a print line nk, where n is said predetermined number of lines in a group and k is an integer.

4. A method according to claim 3, wherein said subset is defined as all of said plurality of input vectors.

5. A method according to claim 3, wherein said subset is defined as all of said plurality of input vectors which are longer than a predetermined length.

6. A method according to claim 3, wherein said step of modifying comprises the step of placing one endpoint of said input vector on the print line $nk_1$ to which said one endpoint was nearest, where n is said predetermined number of lines in a group and $k_1$ is an integer.

7. A method according to claim 6, wherein said step of modifying further comprises the step of adjusting said one of said input vectors as necessary to place the other endpoint of said one of said input vectors on the print line $nk_2$ to which said other endpoint was nearest prior to the step of placing, where n is said predetermined number of lines in a group and $k_2$ is an integer.

8. A method according to claim 1, further comprising the redundancy elimination step of eliminating according to a predetermined redundancy elimination algorithm, from the dots designated for print in the steps of designating for print, dots not needed for a predetermined level of quality.

9. A method according to claim 8, wherein the redundancy elimination step comprises the steps of:

locating a linear group of three dots designated for print on a single print line, the outer two dots of which are closer than a predetermined distance; and eliminating from said dots designated for print the center dot in said linear group.

10. A method according to claim 8, wherein the redundancy elimination step comprises the step of eliminating from said dots designated for print a particular dot if (a) any of the three dots immediately to the left of and on the same print line as the particular dot are designated for print and the dot immediately to the right of the particular dot is designated for print; or (b) either of the two dots immediately to the left of and on the same print line as the particular dot is designated for print and either of the two dots immediately to the right of and on the same print line as the particular dot is designated for print; or (c) the dot immediately to the left of the particular dot is designated for print and any of the three dots immediately to the right of an on the same print line as the particular dot is designated for print.

11. A method according to claim 8, wherein the redundancy elimination step comprises the steps of:

eliminating all dots designated for print on print line $nk_1+m_1$, which dots are considered redundant according to a predetermined test, where n is said predetermined number of lines in a group, $m_1$ is said first predetermined integer and $k_1$ is a particular integer; and subsequently eliminating all dots designated for print on print line $nk_1$, which dots are considered redundant according to said predetermined test, where n is said predetermined number of lines in a group and $k_1$ is said particular integer.

12. A method according to claim 11, further comprising the step of predefining first and second distinct fields of dots, defined by location relative to an arbitrary dot, said first and second distinct fields further being distinct from said arbitrary dot, said first and second fields being predefined such that said arbitrary dot would not be needed for said predetermined level of quality if at least one of the dots in said first field and at least one of the dots in said second field are designated for print, wherein said predetermined test considers each subject one of said dots designated for print redundant if at least one of the dots in said first predetermined field relative to said subject dot is designated for print and at least one of the dots in said second predetermined field relative to said subject dot is designated for print.

13. A method according to claim 8, further comprising printing steps of:

moving a print mechanism along a print pass, said print mechanism being capable of printing a dot on each of a set of at least one of said plurality of print lines at any dot position along the length of said print pass, the print lines in said set of print lines all being spaced from each other by integer multiples of n print lines, where n is said predetermined number of lines in a group; and adaptively controlling the instantaneous velocity at which said print mechanism moves along said print pass while printing dots, said step of adaptively controlling being responsive to the maximum density of dots designated for print in a known upcoming portion of any of said print lines in said set.

14. A method according to claim 1, further comprising the printing steps of:

moving a print mechanism along a print pass, said print mechanism being capable of printing a dot on each of a set of at least one of said plurality of print lines at any dot position along the length of said print pass; and adaptively controlling the instantaneous velocity at which said print mechanism moves along said print pass while printing dots, said step of adaptively controlling being responsive to the maximum density of dots designated for print in a known upcoming portion of any of said print lines in said set.

15. A method according to claim 14, wherein said print mechanism is such that all of the print lines printed by said print mechanism on any given pass are spaced by integer multiples of n print lines from each other where n is said predetermined number of lines in a group.

16. A method according to claim 14, further comprising the step of precalculating a print speed profile prior to the step of moving, said step of adaptively controlling being responsive to said print speed profile.

17. A method according to claim 14, wherein said step of adaptively controlling comprises the steps of determining said known upcoming portion as the next upcoming portion of said print pass which is both preceded and followed by a region of at least a predetermined number of dots along the print pass, within which no dots are designated for print on any of said plurality of print lines.

18. A method according to claim 1, wherein said dots designated for print can include a particular dot designated for print in more than one color, further comprising the step of eliminating from said dots designated for print a chosen one of the dots in each of a plurality of mutually distinct adjacent pairs of dots in said dots designated for print, said chosen one of said dots being chosen consistently over all colors.

19. A method according to claim 1, wherein said dots designated for print can include a particular dot designated for print in more than one color, further comprising the step of eliminating from said dots designated for print a chosen one of the dots in each of a plurality of mutually distinct dot pairs, each of said dot pairs consisting of two adjacent dots designated for print on a single print line, said chosen one of said dots being chosen consistently over all colors.

20. A method according to claim 19, wherein each of said dot pairs consists of a left-hand dot and a right-hand dot, and wherein the chosen one of the dots is consistently the left-hand dot in all of said dot pairs.

21. A method according to claim 19, wherein each of said dot pairs consists of a left-hand dot and a right-hand dot, and wherein the chosen one of the dots is consistently the right-hand dot in all of said dot pairs.

22. A method for converting a plurality of operating vectors for printing on an output device having a plurality of print lines, comprising the steps of:

designating for print dots of said operating vectors, which dots occur on any of the print lines nk, where n is a predetermined number of lines in a group and k is any integer;

designating for print dots of only those of said operating vectors having a slope smaller than a predetermined first angle to the print lines, which dots occur on any of the print lines $nk+m_1$, where n is said predetermined number of lines in a group, $m_1$ is a first predetermined integer between 0 and n exclusive, and k is any integer; and designating for print dots of only those of said operating vectors having a slope smaller than a predetermined second angle to the print lines, said second angle being smaller than said first angle, which dots occur on any of the print lines $nk+m_2$ or on any of the print lines $nk+m_3$, where n is said predetermined number of lines in a group, $m_2$ is a second predetermined integer between 0 and $m_1$ exclusive, $m_3$ is a third predetermined integer between $m_1$ and n exclusive, and k is any integer.

23. A method according to claim 22, wherein n is a multiple of 4, $m_1 = n/2$, $m_2 = m_1/2$ and $m_3 = 3m_1/2$.

24. A method according to claim 22, wherein said first angle is less than or equal to 45°.

25. A method according to claim 22, further comprising the step of designating for print dots of those of said operating vectors having a slope between said second angle to the print lines and a predetermined third angle to the print lines, said third angle being between said first angle and said second angle, which dots occur on any of the print lines $nk + m_2$, where n is said predetermined number of lines in a group, $m_2$ is said second predetermined integer, and k is any integer.

26. A method according to claim 25, wherein n is a multiple of 4, $m_1 = n/2$, $m_2 = m_1/2$ and $m_3 = 3m_1/2$.

27. A method according to claim 26, wherein said first angle is less than or equal to 45°.

28. A method according to claim 11, further comprising the step of designating for print dots of those of said operating vectors having a slope between said second angle to the print lines and a predetermined third angle to the print lines, said third angle being between said first angle and said second angle, which dots occur on any of the print lines $nk + m_3$, where n is said predetermined number of lines in a group, $m_3$ is said third predetermined integer, and k is any integer.

29. A method according to claim 22, further comprising the redundancy elimination steps of:
   eliminating all dots designated for print on a print line $k_1 + m_2$, which dots are not needed for a predetermined level of quality, where n is said predetermined number of lines in a group, $m_2$ is said second predetermined integer and $k_1$ is a particular integer;
   subsequently eliminating all dots designated for print on print line $nk_1 + m_1$, which dots are not needed for said predetermined level of quality, where n is said predetermined number of lines in a group, $m_1$ is said first predetermined integer and $k_1$ is said particular integer; and
   subsequently eliminating all dots designated for print on print line $nk_1$, which dots are not needed for said predetermined level of quality, where n is said predetermined number of lines in a group and $k_1$ is said particular integer.

30. A method according to claim 29, further comprising, prior to the step of eliminating dots designated for print on print line $nk_1 + m_2$, the redundancy elimination step of eliminating all dots designated for print on print line $nk_1 + m_3$, which dots are not needed for said predetermined level of quality, where n is said predetermined number of lines in a group, $m_3$ is said third predetermined integer and $k_1$ is said particular integer.

31. A method for preparing a dot pattern for print on a plurality of print lines, comprising the steps of:
   providing a pattern of dots designated for print;
   eliminating from said dot pattern, according to a predetermined redundancy elimination algorithm, dots not needed for a predetermined level of quality, including eliminating from said pattern a particular dot if (a) any of the three dots immediately to the left of and on the same print line as the particular dot are designated for print and the dot immediately to the right of the particular dot is designated for print; or (b) either of the two dots immediately to the left of and on the same print line as the particular dot is designated for print and either of the two dots immediately to the right of and on and same print line as the particular dot is designated for print; or (c) the dot immediately to the left of the particular dot is designated for print and any of the three dots immediately to the right of an on the same print line as the particular dot is designated for print.

32. A method for converting a plurality of operating vectors for printing on an output device having a plurality of print lines, comprising the steps of:
   designating for print dots of said operating vectors, which dots occur on any of the print lines nk, where n is a predetermined number of lines in a group and k is any integer, n being a multiple of 2;
   designating for print dots of only those of said operating vectors having a slope smaller than a predetermined first angle to the print lines, said first angle being less than or equal to 45°, which dots occur on any of the print lines $nk + n/2$, where n is said predetermined number of lines in a group and k is any integer;
   eliminating from said dots designated for print a repeatably chosen one of the dots in all mutually distinct dot pairs which consist of two adjacent dots designated for print on a single print line;
   moving a print mechanism along a print pass, said print mechanism being capable of printing a dot on each of a set of at least one of said plurality of print lines at any dot position along the length of said print pass; and
   adaptively controlling the speed at which said print mechanism moves along said print pass in response to the maximum density of dots designated for print in a known upcoming portion of any of said print lines in said set.

33. A method for converting a plurality of input vectors for printing on an output device having a plurality of print lines, comprising the steps of:
   deriving a plurality of operating vectors by modifying a subset of said input vectors such that each of the end points of each vector in said subset occurs on a print line nk, where n is a predetermined number of lines in a group and k is an integer, said subset being defined as all of said plurality of input vectors which are longer than a predetermined length and n being an integer multiple of 4;
   designating for print dots of said operating vectors, which dots occur on any of the print lines nk, where n is said predetermined number of lines in a group and k is any integer;
   designating for print dots of only those of said operating vectors having a slope smaller than a predetermined first angle to the print lines, which dots occur on any of the print lines $nk + n/2$, where n is said predetermined number of lines in a group and k is any integer;
   designating for print dots of only those of said operating vectors having a slope smaller than a predetermined second angle to the print lines, said second angle being smaller than said first angle, which dots occur on any of the print lines $nk + n/4$ or an any of the print lines $nk + 3n/4$, where n is said predetermined number of lines in a group and k is any integer;
   eliminating from said dots designated for print a repeatably chosen one of the dots in all mutually distinct dot pairs which consist of two adjacent dots designated for print on a single print line;

precalculating a print speed profile for a print mechanism to be moved along a print pass, said print mechanism being capable of printing a dot on each of a set of said plurality of print lines at any dot position along the length of said print pass, said step of precalculating including the step of choosing a print speed for each portion of said print pass which is both preceded and followed by a region of at least a predetermined number of dots along the print pass, within which portion no dots are designated for print on any of said print lines in said set; and printing dots from said dots designated for print as said print mechanism moves along said print pass according to said print speed profile.

34. Apparatus for use with an output device capable of printing dots on a plurality of print lines, said plurality of print lines being divided into groups of n print lines each, each of said groups consisting of a major print line and n-1 minor print lines, said apparatus being for use further with input information describing a plurality of input vectors for printing on said output device, comprising:

means for deriving from said input information operating information describing an operating vector for each respective one of said input vectors;

means for causing said output device to print dots corresponding to all of said operating vectors, which dots occur on said major print lines;

means for causing said output device to print dots corresponding to only those of said operating vectors having a slope smaller than a predetermined first angle to the print lines, which dots occur on the $m_1$'th print lines of said groups, where $m_1$ is a first predetermined integer between 0 and n exclusive; and means for causing said output device to print dots corresponding to only those of said operating vectors having a slope smaller than a predetermined second angle to the print lines, said second angle being smaller than said first angle, which dots occur on any of the $m_2$'th or $m_3$'th print lines of said groups, where $m_2$ is a second predetermined integer between 0 and $m_1$ exclusive, and $m_3$ is a third predetermined integer between $m_1$ and n exclusive.

35. Apparatus according to claim 34, wherein n is a multiple of 4, $m_1 = n/2$, $m_2 = m_1/2$, $m_3 = 3m_1/2$, and said first angle is less than or equal to 45°.

36. Apparatus for use with an output device capable of printing dots on a plurality of print lines, said apparatus being for use further with an input pattern of dots designated for print, comprising:

means for eliminating from said dot pattern the center dot in a linear group of three dots in said pattern, designated for print on a single print line, the outer two dots of which are closer than a predetermined distance, including means for eliminating from said pattern a particular dot if (a) any of the three dots immediately to the left of and on the same print line as the particular dot are designated for print and the dot immediately to the right of the particular dot is designated for print; or (b) either of the two dots immediately to the left of and on the same print line as the particular dot is designated for print and either of the two dots immediately to the right of and on the same print line as the particular dot is designated for print; or (c) the dot immediately to the left of the particular dot is designated for print and any of the three dots immediately to the right of an on the same line as the particular dot is designated for print; and means for providing the resulting dot pattern for print.

37. A method for preparing a dot pattern for print on a plurality of print lines, comprising the steps of:

providing a pattern of dots designated for print; and eliminating from said dot pattern, according to a predetermined redundancy elimination algorithm, dots not needed for a predetermined level of quality, said step of eliminating comprising the steps of:

predefining first and second distinct fields of dots, defined by location relative to an arbitrary dot, said first and second distinct fields further being distinct from said arbitrary dot, said first and second fields being predefined such that said arbitrary dot would not be needed for said predetermined level of quality if at least one of the dots in said first field and at least one of the dots in said second field are designated for print; and eliminating from said pattern a subject one of said dots designated for print if at least one of the dots in said first predetermined field relative to said subject dot is designated for print and at least one of the dots in said second predetermined field relative to said subject dot is designated for print.

38. A method according to claim 37, wherein said step of eliminating further comprises the steps of:

predefining third and fourth distinct fields of dots, defined by location relative to said arbitrary dot, said third and fourth distinct fields further being distinct from said arbitrary dot, said third and fourth fields being predefined such that said arbitrary dot would not be needed for said predetermined level of quality if at least one of the dots in said third field and at least one of the dots in said fourth field are designated for print; and eliminating from said dot pattern said subject dot if at least one of the dots in said third predetermined field relative to said subject dot is designated for print and at least one of the dots in said fourth predetermined field relative to said subject dot is designated for print.

39. A method according to claim 37, further comprising the printing steps of:

moving a print mechanism along a print pass, said print mechanism being capable of printing a dot on each of a set of at least one of said plurality of print lines at any dot position along the length of said print pass; and adaptively controlling the speed at which said print mechanism moves along said print pass in response to the maximum density of dots designated for print in a known upcoming portion of any of said print lines in said set.

40. A method for preparing a dot pattern for print on a plurality of print lines, comprising the steps of:

providing a pattern of dots designated for print; and eliminating from said dot pattern, according to a predetermined redundancy elimination algorithm, dots not needed for a predetermined level of quality, wherein said step of eliminating comprises the steps of:

eliminating from said pattern all dots designated for print on print line $nk_1 + m_1$, which dots are considered redundant according to a predetermined test, where n is a predetermined number of lines in a group, $m_1$ is a first predetermined integer between 0 and n exclusive, and $k_1$ is a particular integer; and subsequently eliminating from said pattern all dots designated for print on print line $nk_1$, which dots are considered redundant according to said predetermined test, where n is said predetermined number of lines in a group and $k_1$ is said particular integer, said method further comprising the step of predefining first and second distinct fields of dots, defined by location relative to an arbitrary dot, said first and second distinct fields further being distinct from said arbitrary dot, said first and second fields being predefined such that said arbitrary dot would not be needed for said predetermined level of quality if at least one of the dots in said first field and at least one of the dots in said second field are designated for print, wherein said predetermined test considers each subject one of said dots designated for print redundant if at least one of the dots in said first predetermined field relative to said subject dot is designated for print and at least one of the dots in said second predetermined field relative to said subject dot is designated for print.

41. A method according to claim 40, further comprising the printing steps of:

moving a print mechanism along a print pass, said print mechanism being capable of printing a dot on each of a set of at least one of said plurality of print lines at any dot position along the length of said print pass; and adaptively controlling the speed at which said print mechanism moves along said print pass in response to the maximum density of dots designated for print in a known upcoming portion of any of said print lines in said set.

42. A method for preparing a dot pattern for print on a plurality of print lines, comprising the steps of:

providing a pattern of dots designated for print; and eliminating from said dot pattern, according to a predetermined redundancy elimination algorithm, dots not needed for a predetermined level of quality, wherein said step of eliminating comprises the steps of:

eliminating from said pattern all dots designated for print on a print line $nk_1+m_2$, which dots are considered redundant according to a predetermined test, where n is a predetermined number of lines in a group, $m_2$ is a second predetermined integer between 0 and n exclusive, and $k_1$ is a particular integer;

subsequently eliminating from said pattern all dots designated for print on print line $nk_1+m_1$, which dots are considered redundant according to said predetermined test, where n is said predetermined number of lines in a group, $m_1$ is a first predetermined integer between 0 and n exclusive, and different from $m_2$, and $k_1$ is said particular integer; and subsequently eliminating from said pattern all dots designated for print on print line $nk_1$, which dots are considered redundant according to said predetermined test, where n is said predetermined number of lines in a group and $k_1$ is said particular integer, said method further comprising the step of predefining first and second distinct fields of dots, defined by location relative to an arbitrary dot, said first and second distinct fields further being distinct from said arbitrary dot, said first and second fields being predetermined such that said arbitrary dot would not be needed for said predetermined level of quality if at least one of the dots in said first field and at least one of the dots in said second field are designated for print, wherein said predetermined test considers each subject one of said dots designated for print redundant if at least one of the dots in said first predetermined field relative to said subject dot is designated for print and at least one of the dots in said second predetermined field relative to said subject dot is designated for print.

43. A method for preparing a dot pattern for print on a plurality of print lines, comprising the steps of:

providing a pattern of dots designated for print; and eliminating from said dot pattern, according to a predetermined redundancy elimination algorithm, dots not needed for a predetermined level of quality, wherein said step of eliminating, for a subject dot in the center of a $7\times 7$ square of dots numbered 1 through 7 from left to right across the top row, 8 through 14 from left to right across the second row, 15 through 21 from left to right across the third row, 22 through 28 from left to right across the fourth row, 29 through 35 from left to right across the fifth row, 36 through 42 from left to right across the sixth row, and 43 through 49 from left to right across the seventh row, comprises the step of eliminating said subject dot if at least one of the following conditions are true:

(a) at least one of dots 17, 24 and 31, and at least one of dots 19, 20, 21, 26, 27, 28, 33, 34 and 35, are designated for print;

(b) at least one of dots 16, 23 and 30, and at least one of dots 19, 20, 26, 27, 33 and 34, are designated for print;

(c) at least one of dots 15, 22 and 29, and at least one of dots 19, 26 and 33, are designated for print;

(d) at least one of dots 17, 18 and 19, and at least one of dots 31, 32, 33, 38, 39, 40, 45, 46 and 47, are designated for print;

(e) at least one of dots 10, 11 and 12, and at least one of dots 31, 32, 33, 38, 39 and 40, are designated for print;

(f) at least one of dots 3, 4 and 5, and at least one of dots 31, 32 and 33, are designated for print;

(g) at least one of dots 10, 16 and 17, and at least one of dots 33, 34, 35, 40, 41, 42, 47, 48 and 49, are designated for print;

(h) at least one of dots 3, 9 and 15, and at least one of dots 33, 34, 35, 40, 41 and 47, are designated for print;

(i) at least one of dots 1, 2 and 8, and at least one of dots 33, 34 and 40, are designated for print;

(j) at least one of dots 12, 19 and 20, and at least one of dots 29, 30, 31, 36, 37, 38, 43, 44 and 45, are designated for print;

(k) at least one of dots 5, 13 and 21, and at least one of dots 29, 30, 31, 37, 38 and 45, are designated for print;

(l) at least one of dots 6, 7 and 14, and at least one of dots 30, 31 and 38, are designated for print.

44. A method for preparing a dot pattern for print on a plurality of print lines, comprising the steps of:
 providing a pattern of dots designated for print; and
 eliminating from said dot pattern, according to a predetermined redundancy elimination algorithm, dots not needed for a predetermined level of quality,
 wherein said step of eliminating comprises the steps of:
  eliminating from said pattern all dots designated for print on print line $nk_1+m_1$, which dots are considered redundant according to a predetermined test, where n is a predetermined number of lines in a group, $m_1$ is a first predetermined integer between 0 and n exclusive, and $k_1$ is a particular integer; and
  subsequently eliminating from said pattern all dots designated for print on print line $nk_1$, which dots are considered redundant according to said predetermined test, where n is said predetermined number of lines in a group and $k_1$ is said particular integer,
 wherein for each subject one of said dots designated for print which is located in the center of a respective 7×7 square of dots numbered 1 through 7 from left to right across the top row, 8 through 14 from left to right across the second row, 15 through 21 from left to right across the third row, 22 through 28 from left to right across the fourth row, 29 through 35 from left to right across the fifth row, 36 through 42 from left to right across the sixth row, and 43 through 49 from left to right across the seventh row, said predetermined test considers said subject dot redundant if at least one of the following conditions are true:
 (a) at least one of dots 17, 24 and 31, and at least one of dots 19, 20, 21, 26, 27, 28, 33, 34 and 35, are designated for print;
 (b) at least one of dots 16, 23 and 30, and at least one of dots 19, 20, 26, 27, 33 and 34, are designated for print;
 (c) at least one of dots 15, 22 and 29, and at least one of dots 19, 26 and 33, are designated for print;
 (d) at least one of dots 17, 18 and 19, and at least one of dots 31, 32, 33, 38, 39, 40, 45, 46 and 47, are designated for print;
 (e) at least one of dots 10, 11 and 12, and at least one of dots 31, 32, 33, 38, 39 and 40, are designated for print;
 (f) at least one of dots 3, 4 and 5, and at least one of dots 31, 32 and 33, are designated for print;
 (g) at least one of dots 10, 16 and 17, and at least one of dots 33, 34, 35, 40, 41, 42, 47, 48 and 49, are designated for print;
 (h) at least one of dots 3, 9 and 15, and at least one of dots 33, 34, 35, 40, 41 and 47, are designated for print;
 (i) at least one of dots 1, 2 and 8, and at least one of dots 33, 34 and 40, are designated for print;
 (j) at least one of dots 12, 19 and 20, and at least one of dots 29, 30, 31, 36, 37, 38, 43, 44 and 45, are designated for print;
 (k) at least one of dots 5, 13 and 21, and at least one of dots 29, 30, 31, 37, 38 and 45, are designated for print;
 (l) at least one of dots 6, 7 and 14, and at least one of dots 30, 31 and 38, are designated for print.

45. A method for preparing a dot pattern for print on a plurality of print lines, comprising the steps of:
 providing a pattern of dots designated for print;
 eliminating from said pattern all dots designated for print on print line $nk_1+m_1$, which dots are considered redundant according to a predetermined test, where n is a predetermined number of lines in a group, $m_1$ is a first predetermined integer between 0 and n exclusive, and $k_1$ is a particular integer; and
 subsequently eliminating from said pattern all dots designated for print on print line $nk_1$, which dots are considered redundant according to said predetermined test, where n is said predetermined number of lines in a group and $k_1$ is said particular integer,
 wherein for each subject one of said dots designated for print which is located in the center of a respective 7×7 square of dots numbered 1 through 7 from left to right across the top row, 8 through 14 from left to right across the second row, 15 through 21 from left to right across the third row, 22 through 28 from left to right across the fourth row, 29 through 35 from left to right across the fifth row, 36 through 42 from left to right across the sixth row, and 43 through 49 from left to right across the seventh row, said predetermined test considers said subject dot redundant if at least one of the following conditions are true:
 (a) at least one of dots 17, 24 and 31, and at least one of dots 19, 20, 21, 26, 27, 33, 34 and 35, are designated for print;
 (b) at least one of dots 16, 23 and 30, and at least one of dots 19, 20, 26, 27, 33 and 34, are designated for print;
 (c) at least one of dots 15, 22 and 29, and at least one of dots 19, 26 and 33, are designated for print;
 (d) at least one of dots 17, 18 and 19, and at least one of dots 31, 32, 33, 28, 39, 40, 45, 46 and 47, are designated for print;
 (e) at least one of dots 10, 11 and 12, and at least one of dots 31, 32, 33, 38, 39 and 40, are designated for print;
 (f) at least one of dots 3, 4 and 5, and at least one of dots 31, 32 and 33, are designated for print;
 (g) at least one of dots 10, 16 and 17, and at least one of dots 33, 34, 35, 40, 41, 42, 47, 48 and 49, are designated for print;
 (h) at least one of dots 3, 9 and 15, and at least one of dots 33, 34, 35, 40, 41 and 47, are designated for print;
 (i) at least one of dots 1, 2 and 8, and at least one of dots 33, 34 and 40, are designated for print;
 (j) at least one of dots 12, 19 and 20, and at least one of dots 29, 30, 31, 36, 37, 38, 43, 44 and 45, are designated for print;
 (k) at least one of dots 5, 13 and 21, and at least one of dots 29, 30, 31, 37, 38 and 45, are designated for print;
 (l) at least one of dots 6, 7 and 14, and at least one of dots 30, 31 and 38, are designated for print.

46. A method according to claim 45, further comprising the printing steps of:
 moving a print mechanism along a print pass, said print mechanism being capable of printing a dot on each of a set of at least one of said plurality of print lines at any dot position along the length of said print pass; and adaptively controlling the speed at which said print mechanism moves along said print pass in response to the maximum density of dots designated for print in a known upcoming portion of any of said print lines in said set.

47. A method for converting a plurality of operating vectors for printing on an output device having a plurality of print lines, comprising the steps of:

designating for print dots of said operating vectors, which dots occur on any of the print lines nk, where n is a predetermined number of lines in a group and k is any integer; and designating for print dots of only those of said operating vectors having a slope smaller than a predetermined first angle to the print lines, which dots occur on any of the print lines $nk+m_1$, where n is said predetermined number of lines in a group, $m_1$ is a first predetermined integer between 0 and n exclusive, and k is any integer, said method further comprising the steps of:

predefining first and second distinct fields of dots, defined by location relative to an arbitrary dot, said first and second distinct fields further being distinct from said arbitrary dot, said first and second fields being predefined such that said arbitrary dot would not be needed for a predetermined level of quality if at least one of the dots in said first field and at least one of the dots in said second field are designated for print; and eliminating from said pattern a subject one of said dots designated for print if at least one of the dots in said first predetermined field relative to said subject dot is designated for print and at least one of the dots in said second predetermined field relative to said subject dot is designated for print.

48. Apparatus for use with an output device capable of printing dots on a plurality of print lines, said apparatus being for use further with an input pattern of dots designated for print, comprising:

first and second distinct fields of dots, defined by location relative to an arbitrary dot, said first and second distinct fields further being distinct from said arbitrary dot, said first and second fields being predefined such that said arbitrary dot would not be needed for a predetermined level of quality if at least one of the dots in said first field and at least one of the dots in said second field are designated for print;

means for eliminating from said pattern a subject one of said dots designated for print if at least one of the dots in said first predetermined field relative to said subject dot is designated for print and at least one of the dots in said second predetermined field relative to said subject dot is designated for print; and means for providing the resulting dot pattern for print.

49. Apparatus for use with an output device capable of printing dots on a plurality of print lines, said apparatus being for use further with an input pattern of dots designated for print, comprising:

(a) means for (1) eliminating from said pattern all dots designated for print on print line $nk_1+m_1$, which dots are considered redundant according to a predetermined test, where n is a predetermined number of lines in a group, $m_1$ is a first predetermined integer between 0 and n exclusive, and $k_1$ is a particular integer, and (2) subsequently eliminating from said pattern all dots designated for print on print line $nk_1$, which dots are considered redundant according to said predetermined test, where n is said predetermined number of lines in a group and $k_1$ is said particular integer; and (b) means for providing the resulting dot pattern for print, wherein said predetermined test considers each subject one of said dots designated for print redundant if at least one of the dots in a first predetermined field of dots relative to said subject dot is designated for print and at least one of the dots in a second predetermined field of dots relative to said subject dot is designated for print, and wherein said first and second fields of dots are distinct from each other and from an arbitrary dot, and are predefined by location relative to said arbitrary dot such that said arbitrary dot would not be needed for a predetermined level of quality if at least one of the dots in said first field and at least one of the dots in said second field are designated for print.

50. Apparatus for use with an output device capable of printing dots on a plurality of print lines, said apparatus being for use further with an input pattern of dots designated for print, comprising:

means for (1) eliminating from said pattern all dots designated for print on print line $nk_1+m_1$, which dots are considered redundant according to a predetermined test, where n is a predetermined number of lines in a group, $m_1$ is a first predetermined integer between 0 and n exclusive, and $k_1$ is a particular integer, and (2) subsequently eliminating from said pattern all dots designated for print on print line $nk_1$, which dots are considered redundant according to said predetermined test, where n is said predetermined number of lines in a group and $k_1$ is said particular integer; and means for providing the resulting dot pattern for print, wherein, for each subject one of said dots designated for print which is located in the center of a respective 7×7 square of dots numbered 1 through 7 from left to right across the top row, 8 through 14 from left to right across the second row, 15 through 21 from left to right across the third row, 22 through 28 from left to right across the fourth row, 29 through 35 from left to right across the fifth row, 36 through 42 from left to right across the sixth row, and 43 through 49 from left to right across the seventh row, said predetermined test considers said subject dot redundant if at least one of the following conditions are true:

(a) at least one of dots 17, 24 and 31, and at least one of dots 19, 20, 21, 26, 27, 28, 33, 34 and 35, are designated for print;

(b) at least one of dots 16, 23 and 30, and at least one of dots 19, 20, 26, 27, 33 and 34, are designated for print;

(c) at least one of dots 15, 22 and 29, and at least one of dots 19, 26 and 33, are designated for print;

(d) at least one of dots 17, 18 and 19, and at least one of dots 31, 32, 33, 38, 39, 40, 45, 46 and 47, are designated for print;

(e) at least one of dots 10, 11 and 12, and at least one of dots 31, 32, 33, 38, 39 and 40, are designated for print;

(f) at least one of dots 3, 4 and 5, and at least one of dots 31, 32 and 33, are designated for print;
(g) at least one of dots 10, 16 and 17, and at least one of dots 33, 34, 35, 40, 41, 42, 47, 48 and 49, are designated for print;
(h) at least one of dots 3, 9 and 15, and at least one of dots 33, 34, 35, 40, 41 and 47, are designated for print;
(i) at least one of dots 1, 2 and 8, and at least one of dots 33, 34 and 40, are designated for print;
(j) at least one of dots 12, 19 and 20, and at least one of dots 29, 30, 31, 36, 37, 38, 43, 44 and 45, are designated for print;
(k) at least one of dots 5, 13 and 21, and at least one of dots 29, 30, 31, 37, 38 and 45, are designated for print;
(l) at least one of dots 6, 7 and 14, and at least one of dots 30, 31 and 38, are designated for print.

* * * * *

UNITED STATES PATENT AND TRADEMARK OFFICE
CERTIFICATE OF CORRECTION

PATENT NO.   :  5,016,195
DATED        :  May 14, 1991
INVENTOR(S)  :  RICK A. WARP

It is certified that error appears in the above-identified patent and that said Letters Patent is hereby corrected as shown below:

Column 59, line 42, change "victors" to --vectors--.

Column 63, line 20, change "claim 11" to --claim 22--.

Column 66, line  3, between "same" and "line" add --print--.

Column 68, line  8, change "predetermined" to --predefined--.

Column 70, line 33, between "27," and "33," add --28,--.

Column 70, line 41, change "28" to --38--.

Signed and Sealed this

Eighth Day of December, 1992

Attest:

DOUGLAS B. COMER

*Attesting Officer*     *Acting Commissioner of Patents and Trademarks*